United States Patent
Ahmad et al.

(10) Patent No.: US 9,824,260 B2
(45) Date of Patent: Nov. 21, 2017

(54) DEPTH IMAGE PROCESSING

(71) Applicant: Microsoft Technology Licensing, LLC, Redmond, WA (US)

(72) Inventors: Anis Ahmad, Kirkland, WA (US); Jonathan Hoof, Kenmore, WA (US); Daniel Kennett, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 147 days.

(21) Appl. No.: 14/793,337

(22) Filed: Jul. 7, 2015

(65) Prior Publication Data
US 2015/0310256 A1    Oct. 29, 2015

Related U.S. Application Data

(63) Continuation of application No. 13/801,966, filed on Mar. 13, 2013, now Pat. No. 9,092,657.

(51) Int. Cl.
| | |
|---|---|
| *G06K 9/00* | (2006.01) |
| *G06T 5/00* | (2006.01) |
| *G06T 19/00* | (2011.01) |

(52) U.S. Cl.
CPC ......... *G06K 9/00201* (2013.01); *G06T 5/005* (2013.01); *G06T 19/00* (2013.01); *G06T 2207/10028* (2013.01)

(58) Field of Classification Search
CPC ............... G06K 9/00201; G06T 19/00; G06T 2207/10028; G06T 5/005
(Continued)

(56) References Cited

U.S. PATENT DOCUMENTS

| | | |
|---|---|---|
| 4,627,620 A | 12/1986 | Yang |
| 4,630,910 A | 12/1986 | Ross et al. |
| (Continued) | | |

FOREIGN PATENT DOCUMENTS

| | | |
|---|---|---|
| CN | 101254344 B | 6/2010 |
| CN | 102272778 A | 12/2011 |
| (Continued) | | |

OTHER PUBLICATIONS

Communication of Intent to Grant dated Mar. 2, 2016 in European Patent Application No. 14719548.1 filed Mar. 10, 2014.
(Continued)

*Primary Examiner* — Francis G Geroleo
(74) *Attorney, Agent, or Firm* — Vierra Magen Marcus LLP

(57) ABSTRACT

Embodiments described herein can be used to detect holes in a subset of pixels of a depth image that has been specified as corresponding to a user, and to fill such detected holes. Additionally, embodiments described herein can be used to produce a low resolution version of a subset of pixels that has been specified as corresponding to a user, so that when an image including a representation of the user is displayed, the image respects the shape of the user, yet is not a mirror image of the user. Further, embodiments described herein can be used to identify pixels, of a subset of pixels specified as corresponding to the user, that likely correspond to a floor supporting the user. This enables the removal of the pixels, identified as likely corresponding to the floor, from the subset of pixels specified as corresponding to the user.

20 Claims, 14 Drawing Sheets

(58) Field of Classification Search
USPC .......................................................... 348/43
See application file for complete search history.

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,237 B1 | 8/2007 | Luck et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |

(56) References Cited

U.S. PATENT DOCUMENTS

| | | | |
|---|---|---|---|
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,284,258 | B1 | 10/2012 | Cetin et al. |
| 8,340,432 | B2 | 12/2012 | Mathe et al. |
| 9,031,282 | B2 * | 5/2015 | Park .................. G06T 7/0079 382/103 |
| 2008/0026838 | A1 | 1/2008 | Dunstan et al. |
| 2009/0265671 | A1 | 10/2009 | Sachs et al. |
| 2009/0298650 | A1 | 12/2009 | Kutliroff |
| 2010/0197390 | A1 * | 8/2010 | Craig .................. G06K 9/00369 463/30 |
| 2011/0069870 | A1 * | 3/2011 | Marais .................. G06T 7/75 382/106 |
| 2011/0069888 | A1 * | 3/2011 | Lim .................. G06K 9/00369 382/190 |
| 2011/0090311 | A1 | 4/2011 | Fang et al. |
| 2011/0110585 | A1 * | 5/2011 | Kang .................. G06K 9/00369 382/164 |
| 2011/0249190 | A1 * | 10/2011 | Nguyen .................. H04N 5/272 348/708 |
| 2011/0292036 | A1 * | 12/2011 | Sali .................. G06T 13/40 345/419 |
| 2011/0293137 | A1 * | 12/2011 | Gurman .............. G06K 9/00201 382/103 |
| 2012/0056982 | A1 | 3/2012 | Katz et al. |
| 2012/0159290 | A1 | 6/2012 | Pulsipher et al. |
| 2012/0214594 | A1 | 8/2012 | Kirovski et al. |
| 2012/0242789 | A1 | 9/2012 | Cheng et al. |
| 2012/0306904 | A1 | 12/2012 | Francois et al. |
| 2012/0307010 | A1 | 12/2012 | Evertt et al. |
| 2012/0308140 | A1 | 12/2012 | Ambrus et al. |
| 2012/0309532 | A1 | 12/2012 | Ambrus et al. |
| 2012/0326976 | A1 | 12/2012 | Markovic et al. |
| 2013/0100125 | A1 | 4/2013 | Zhang et al. |
| 2013/0101170 | A1 * | 4/2013 | Park .................. G06T 7/0079 382/103 |
| 2013/0135298 | A1 | 5/2013 | Isogai et al. |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2010/144074 A1 | 12/2010 |

OTHER PUBLICATIONS

Response to Communication under Rule 71(3) EPC dated Jun. 30, 2016 in European Patent Application No. 14719548.1 filed Mar. 10, 2014.

Brunner, Simon, "Using Microsoft Kinect Sensor to Perform Commands on Virtual Objects", Published on: Oct. 2, 2012, Available at: https://diuf.unifr.ch/main/diva/sites/diuf.unifr.ch.main.diva/files/Thesis%20paper.pdf.

Brubaker, Marcus A., "Physical Models of Human Motion for Estimation and Scene Analysis", In PhD. Thesis Submitted in Conformity with the Requirements for the Degree of Doctor of Philosophy, Graduate Department of Computer Science, University of Toronto, Jan. 5, 2012, 169 pages.

Gonzalez, et al., "Estimation of the Center of Mass with Kinect and Wii Balance Board", In Proceedings of IEEE/RSJ International Conference on Intelligent Robot and Systems, Oct. 7, 2012, 6 pages.

Sinthanayothin, et al., "Skeleton Tracking using Kinect Sensor & Displaying in 3D Virtual Scene", In International Journal of Advancements in Computing Technology, vol. 4, Issue 11, Jun. 2012, 11 pages.

Camplani, et al., "Efficient Spatio-Temporal Hole Filling Strategy for Kinect Depth Maps", In Proceedings of Three-Dimensional Image Processing & Applications II, Feb. 9, 2012, 10 pages.

Gaidon, et al., "A Time Series Kernel for Action Recognition", In Proceedings of the British Machine Vision Conference, Sep. 2011, 11 pages.

Lien, et al., "Skeleton-Based Data Compression for Multi-Camera Tele-Immersion System", In Advances in Visual Computing, Third International Symposium, Nov. 26, 2007, 10 pages.

Ye, et al., "Accurate 3D Pose Estimation from a Single Depth Image", In IEEE International Conference on Computer Vision, Nov. 6, 2011, 8 pages.

Obdrzalek, et al., "Accuracy and Robustness of Kinect Pose Estimation in the Context of Coaching of Elderly Population", In Annual International Conference of the IEEE Engineering in Medicine and Biology Society, Aug. 28, 2012, 6 pages.

Manasrah, Ahmad Adli, "Human Motion Tracking for Assisting Balance Training and Control of a Humanoid Robot", In PhD. Thesis Submitted in Partial Fulfilment of the Requirements for the Degree of Master of Science in Mechanical Engineering, Department of Mechanical Engineering, University of South Florida, Jan. 1, 2012, 82 pages.

Strauss, Ben, "Kinect Can 'Sort of' Handle Players Lying Down", Published on: Jul. 14, 2010, Available at: http://www.industrygamers.com/news/kinect-can-sort-of-handle-players-lying-down/.

Brubaker, Marcus, "Physics-Based Priors for Human Pose Tracking", In a Thesis Submitted in Conformity with the Requirements for the Degree of Master of Science, Graduate Department of Computer Science, University of Toronto, Mar. 11, 2013, 89 pages.

Poulios, Nikolaos, "Sensor Based Physical Interaction for Embodied Playful Learning Games", In Master Thesis Project, Jul. 2012, 81 pages.

Yu, et al., "Automatic Human Body Tracking and Modeling from Monocular Video Sequences", In IEEE International Conference on Acoustics, Speech and Signal Processing, Apr. 15, 2007, 4 pages.

Isenberg, et al., "Stylizing Silhouettes at Interactive Rates: From Silhouette Edges to Silhouette Strokes", In Journal of Computer Graphics Forum, vol. 21, Issue 3, Sep. 2002, 10 pages.

"1 Kinect Depth Inpainting and Filtering", Retrieved on: Dec. 3, 2013, Available at: http://www.radfordparker.com/papers/kinectinpainting.pdf.

Raskar, et al., "Image Precision Silhouette Edges", In Proceedings of the Symposium on Interactive 3D Graphics, Apr. 26, 1999, 7 pages.

Catto, et al., "Iterative Dynamics with Temporal Coherence", Feb. 22, 2005, Menlo Park, California, 24 pages.

Sole et al., "Hierarchical Hole-Filling for Depth-based View Synthesis in FTV and 3D Video", Draft, IEEE Journal of Selected Topics in Signal Processing, Jun. 2012.

International Search Report & Written Opinion, dated Jul. 17, 2014, in PCT Patent Application No. PCT/US2014/022464, filed Mar. 10, 2014, 12 pages.

Smolic, et al., "Intermediate View Interpolation Based on Multiview Video Plus Depth for Advanced 3D Video Systems", In IEEE 15th International Conference on Image Processing, Oct. 12, 2008, pp. 2448-2451.

(56) References Cited

OTHER PUBLICATIONS

Liu, et al., "Texture-Adaptive Hole-filling Algorithm in Raster-Order for Three-Dimensional Video Applications", In Journal of Neurocomputing, vol. 111, Jan. 31, 2013, pp. 154-160.
Vlsaic, et al., "Dynamic Shape Capture using Multi-View Photometric Stereo", In Proceedings of ACM Transactions on Graphics, vol. 28, Issue 5, Dec. 1, 2009, 11 Pages.
Amendment dated Nov. 17, 2014, in PCT Patent Application No. PCT/US2014/022464 filed Mar. 10, 2014.
International Preliminary Report on Patentability dated Mar. 9, 2015, in PCT Patent Application No. PCT/US2014/022464 filed Mar. 10, 2014.
Amendment filed Mar. 17, 2014, in U.S. Appl. No. 13/801,966 filed Mar. 13, 2013.
Notice of Allowance dated Mar. 17, 2014, in U.S. Appl. No. 13/801,966 filed Mar. 13, 2013.
Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.
Miyagawa et al., "CCD-Based Range Finding Sensor", Oct. 1997, pp. 1648-1652, vol. 44 No. 10, IEEE Transactions on Electron Devices.
Rosenhahn et al., "Automatic Human Model Generation", 2005, pp. 41-48, University of Auckland (CITR), New Zealand.
Aggarwal et al., "Human Motion Analysis: A Review", IEEE Nonrigid and Articulated Motion Workshop, 1997, University of Texas at Austin, Austin, TX.
Shao et al., "An Open System Architecture for a Multimedia and Multimodal User Interface", Aug. 24, 1998, Japanese Society for Rehabilitation of Persons with Disabilities (JSRPD), Japan.
Kohler, "Special Topics of Gesture Recognition Applied in Intelligent Home Environments", In Proceedings of the Gesture Workshop, 1998, pp. 285-296, Germany.
Kohler, "Vision Based Remote Control in Intelligent Home Environments", University of Erlangen-Nuremberg/ Germany, 1996, pp. 147-154, Germany.
Kohler, "Technical Details and Ergonomical Aspects of Gesture Recognition applied in Intelligent Home Environments", 1997, Germany.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International Conference on Multimedia and Expo (ICME), Taipei, Taiwan.
Zhao, "Dressed Human Modeling, Detection, and Parts Localization", 2001, The Robotics Institute, Carnegie Mellon University, Pittsburgh, PA.
He, "Generation of Human Body Models", Apr. 2005, University of Auckland, New Zealand.
Isard et al., "Condensation—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collision of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
English Machine-translation of Japanese Publication No. JP08-044490 published on Feb. 16, 1996.
Office Action and Search Report dated May 4, 2017, in Chinese Patent Application No. 201480014513.6, 14 Pages.

* cited by examiner

| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 30 | 30 |
|----|----|----|----|----|----|----|----|----|----|----|----|----|----|----|----|----|----|----|----|----|----|----|----|
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 18 | 9  | 20 | 20 | 19 | 19 | 20 | 20 | 20 | 20 | 30 | 30 |
| 30 | 15 | 15 | 15 | 16 | 16 | 16 | 18 | 8  | 8  | 9  | 9  | 9  | 9  | 9  | 9  | 9  | 9  | 19 | 19 | 20 | 20 | 30 | 30 |
| 30 | 15 | 15 | 15 | 16 | 16 | 16 | 8  | 8  | 7  | 8  | 8  | 8  | 8  | 8  | 8  | 9  | 9  | 9  | 19 | 20 | 30 | 30 | 30 |
| 30 | 15 | 15 | 16 | 16 | 16 | 8  | 7  | 7  | 6  | 7  | 7  | 7  | 7  | 7  | 7  | 8  | 8  | 9  | 9  | 9  | 20 | 30 | 30 |
| 30 | 15 | 15 | 16 | 16 | 8  | 8  | 6  | 6  | 5  | 5  | 5  | 5  | 6  | 7  | 7  | 7  | 8  | 8  | 9  | 19 | 20 | 30 | 30 |
| 30 | 15 | 15 | 16 | 7  | 7  | 7  | 6  | 5  | 5  | 5  | 5  | 5  | 5  | 7  | 6  | 7  | 8  | 8  | 9  | 19 | 20 | 30 | 30 |
| 30 | 15 | 15 | 16 | 7  | 7  | 7  | 5  | 5  | 5  | 5  | 5  | 5  | 5  | 5  | 6  | 7  | 8  | 8  | 9  | 9  | 19 | 30 | 30 |
| 30 | 15 | 15 | 16 | 7  | 7  | 6  | 5  | 5  | 5  | 5  | 5  | 5  | 5  | 5  | 6  | 7  | 8  | 8  | 9  | 9  | 19 | 30 | 30 |
| 30 | 15 | 15 | 7  | 7  | 6  | 6  | 5  | 5  | 5  | 5  | 5  | 5  | 5  | 5  | 6  | 7  | 8  | 8  | 9  | 19 | 19 | 30 | 30 |
| 30 | 15 | 15 | 6  | 6  | 5  | 6  | 5  | 5  | 5  | 4  | 4  | 5  | 4  | 4  | 6  | 7  | 8  | 8  | 9  | 19 | 20 | 30 | 30 |
| 30 | 15 | 15 | 5  | 6  | 5  | 3  | 5  | 5  | 5  | 5  | 5  | 5  | 5  | 5  | 5  | 6  | 7  | 8  | 9  | 19 | 20 | 30 | 30 |
| 30 | 15 | 15 | 4  | 5  | 4  | 4  | 5  | 5  | 5  | 5  | 5  | 5  | 5  | 5  | 6  | 7  | 8  | 9  | 19 | 19 | 30 | 30 | 30 |
| 30 | 15 | 15 | 5  | 5  | 5  | 5  | 5  | 5  | 5  | 5  | 5  | 5  | 5  | 5  | 6  | 7  | 8  | 18 | 18 | 19 | 30 | 30 | 30 |
| 30 | 15 | 15 | 15 | 5  | 4  | 5  | 5  | 5  | 5  | 5  | 5  | 5  | 5  | 5  | 6  | 7  | 8  | 18 | 18 | 18 | 30 | 30 | 30 |
| 30 | 15 | 15 | 15 | 5  | 5  | 5  | 5  | 5  | 5  | 5  | 5  | 5  | 5  | 5  | 6  | 7  | 8  | 18 | 18 | 18 | 30 | 30 | 30 |
| 30 | 15 | 15 | 15 | 15 | 5  | 5  | 5  | 5  | 5  | 5  | 5  | 5  | 5  | 5  | 6  | 7  | 8  | 18 | 18 | 18 | 30 | 30 | 30 |
| 30 | 15 | 15 | 15 | 15 | 15 | 5  | 5  | 5  | 5  | 5  | 5  | 5  | 5  | 5  | 6  | 6  | 7  | 8  | 18 | 18 | 18 | 30 | 30 |
| 30 | 15 | 15 | 15 | 15 | 15 | 5  | 5  | 5  | 5  | 5  | 5  | 5  | 5  | 6  | 7  | 8  | 18 | 18 | 18 | 18 | 30 | 30 | 30 |
| 30 | 15 | 15 | 15 | 15 | 15 | 5  | 5  | 5  | 5  | 5  | 5  | 5  | 6  | 7  | 7  | 18 | 18 | 18 | 18 | 18 | 30 | 30 | 30 |
| 30 | 15 | 15 | 15 | 15 | 15 | 5  | 5  | 5  | 5  | 5  | 5  | 6  | 6  | 7  | 7  | 18 | 18 | 18 | 18 | 18 | 30 | 30 | 30 |
| 30 | 15 | 15 | 15 | 15 | 15 | 5  | 5  | 5  | 5  | 5  | 5  | 6  | 6  | 7  | 7  | 18 | 18 | 18 | 18 | 18 | 30 | 30 | 30 |

FIG. 6

DEPTH IMAGE PROCESSING

PRIORITY CLAIM

This application is a Continuation of U.S. patent application Ser. No. 13/801,966, filed Mar. 13, 2013, which is incorporated herein by reference.

BACKGROUND

Many computing applications such as computer games, multimedia applications, or the like use controls to allow users to manipulate game characters or other aspects of an application. Conventionally, such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat. Recently, cameras have been used to allow users to manipulate game characters or other aspects of an application without the need for conventional handheld game controllers. Further, such cameras have enabled representation of users to be displayed within a game or other application. Such computing systems have often relied on skeletal tracking (ST) techniques to detect motion or other user behaviors as well as to produce representations of users for display. However, while useful for detecting and displaying representations of users in certain situations, ST techniques have proven to be unreliable for detecting and displaying representations of users in other situations. For example, ST techniques are typically unreliable for detecting and displaying representations of a user where the user is laying or sitting on or near the floor.

SUMMARY

Embodiments described herein are for use where depth images are used to detect and display representations of a user and/or to detect user behaviors. More specifically, certain embodiments described herein can be used to detect holes in a subset of pixels of a depth image that has been specified as corresponding to a user, and to fill such detected holes. Such holes may result from a portion of the user occluding another portion of the user when a capture device (e.g., a camera) is used to obtain the depth image. Such embodiments can involve identifying horizontal and vertical spans of pixels (within the subset of pixels specified as corresponding to the user) that are potentially part of a hole, and then analyzing pixels adjacent to such spans to determine whether such adjacent pixels are also to be identified as potentially being part of a hole. Spans that are adjacent to one another can be grouped together into islands of pixels that potentially correspond to holes, and then each island is analyzed and classified as either being a hole or not being a hole. Hole filling is then performed to fill any identified holes, so that results of the hole filling are available when a depth image is used to display a representation of the user.

Additionally, embodiments described herein can be used to produce a low resolution version of a subset of pixels that has been specified as corresponding to a user, so that when a representation of the user is displayed, the image respects the shape of the user and does not smooth distinct body parts of the user, yet is not a mirror image of the user. The producing of such a low resolution version of the subset of pixels that has been specified as corresponding to a user can be performed prior to, after, or completely independent of the above mentioned hole detection and hole filling embodiments, depending upon implementation.

Further, embodiments described herein can be used to identify pixels (within a subset of pixels specified as corresponding to the user) that likely correspond to a floor supporting the user. This enables the removal of the pixels, identified as likely corresponding to the floor, from the subset of pixels specified as corresponding to the user. Such floor detection and removal techniques can be performed prior to, after, or completely independent of, the above mentioned hole detection and hole filling embodiments and/or the above mentioned producing of a low resolution version of the subset of pixels that has been specified as corresponding to a user.

Certain embodiments described herein can be used to adjust a depth image to reduce a sensitivity of the depth image to tilt of a capture device used to obtain the depth image. Such adjusting can include obtaining an up-vector associated with the capture device used to obtain the depth image. Pixels in the depth image are transformed from depth image space to three-dimensional (3D) camera space to produce a 3D representation of the depth image which includes a subset of pixels specified as corresponding to the user. The up-vector is then used to transform the subset of pixels specified as corresponding to the user to a plane having a specified attitude. Thereafter, the 3D representation of the depth image can be transformed from the 3D camera space back to the depth image space.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 depicts exemplary data in an exemplary depth image.

DETAILED DESCRIPTION

Embodiments described herein can be used to detect holes in a subset of pixels of a depth image that has been specified as corresponding to a user, and to fill such detected holes. Additionally, embodiments described herein can be used to produce a low resolution version of a subset of pixels that has been specified as corresponding to a user, so that when a representation of the user is displayed, the image respects the shape of the user, yet is not a mirror image of the user. Further, embodiments described herein can be used to identify pixels, of a subset of pixels specified as corresponding to the user, that likely correspond to a floor supporting the user. This enables the removal of the pixels, identified as likely corresponding to the floor, from the subset of pixels specified as corresponding to the user. Additional embodiments described herein can be used to adjust a depth image to reduce a sensitivity of the depth image to tilt of a capture device used to obtain the depth image. Before describing additional details of such embodiments, exemplary systems with which such embodiments can be used will be described.

Figure 1A:
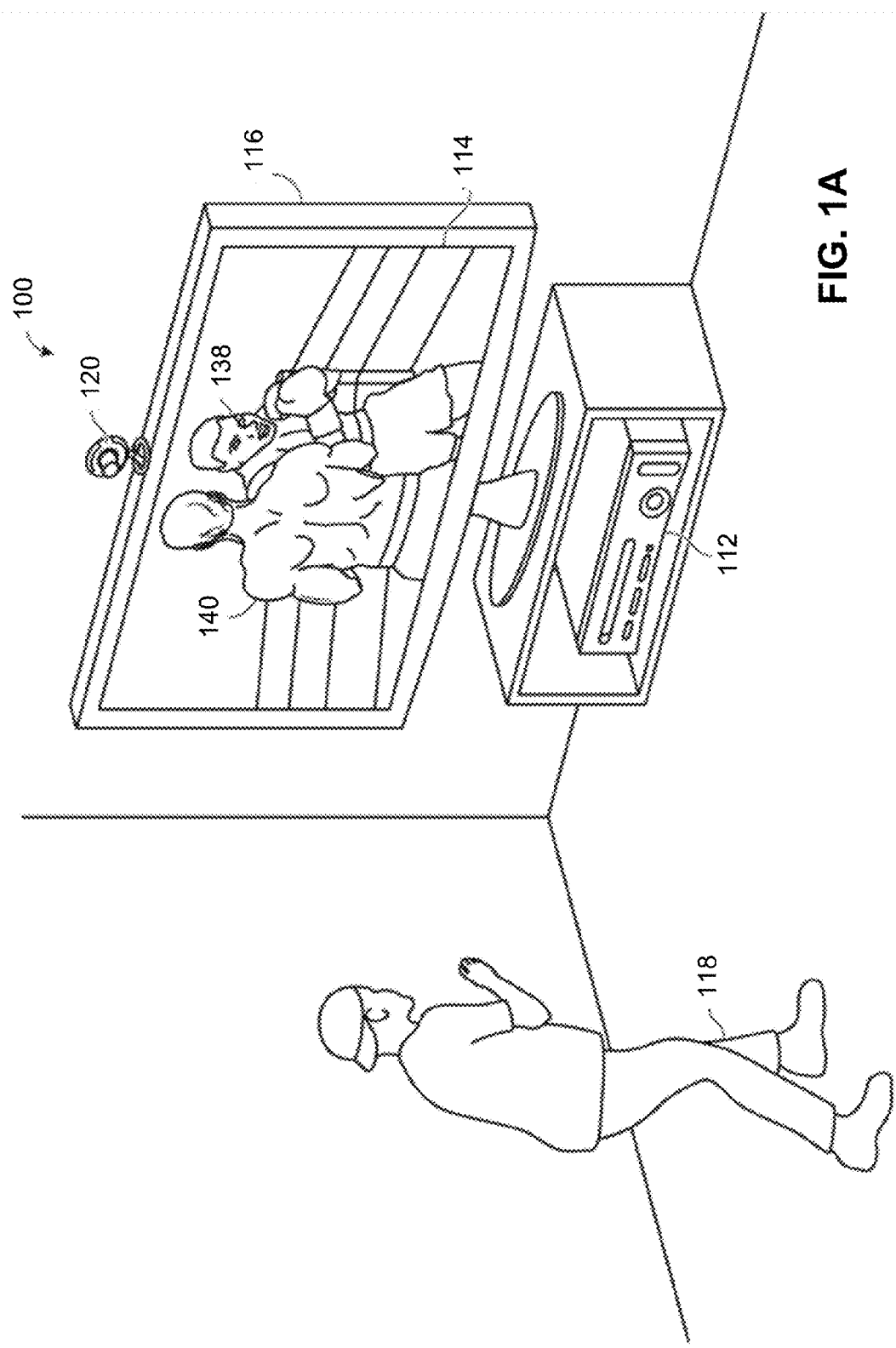
FIGS. 1A and 1B illustrate an example embodiment of a tracking system with a user playing a game.
Figure 1B:
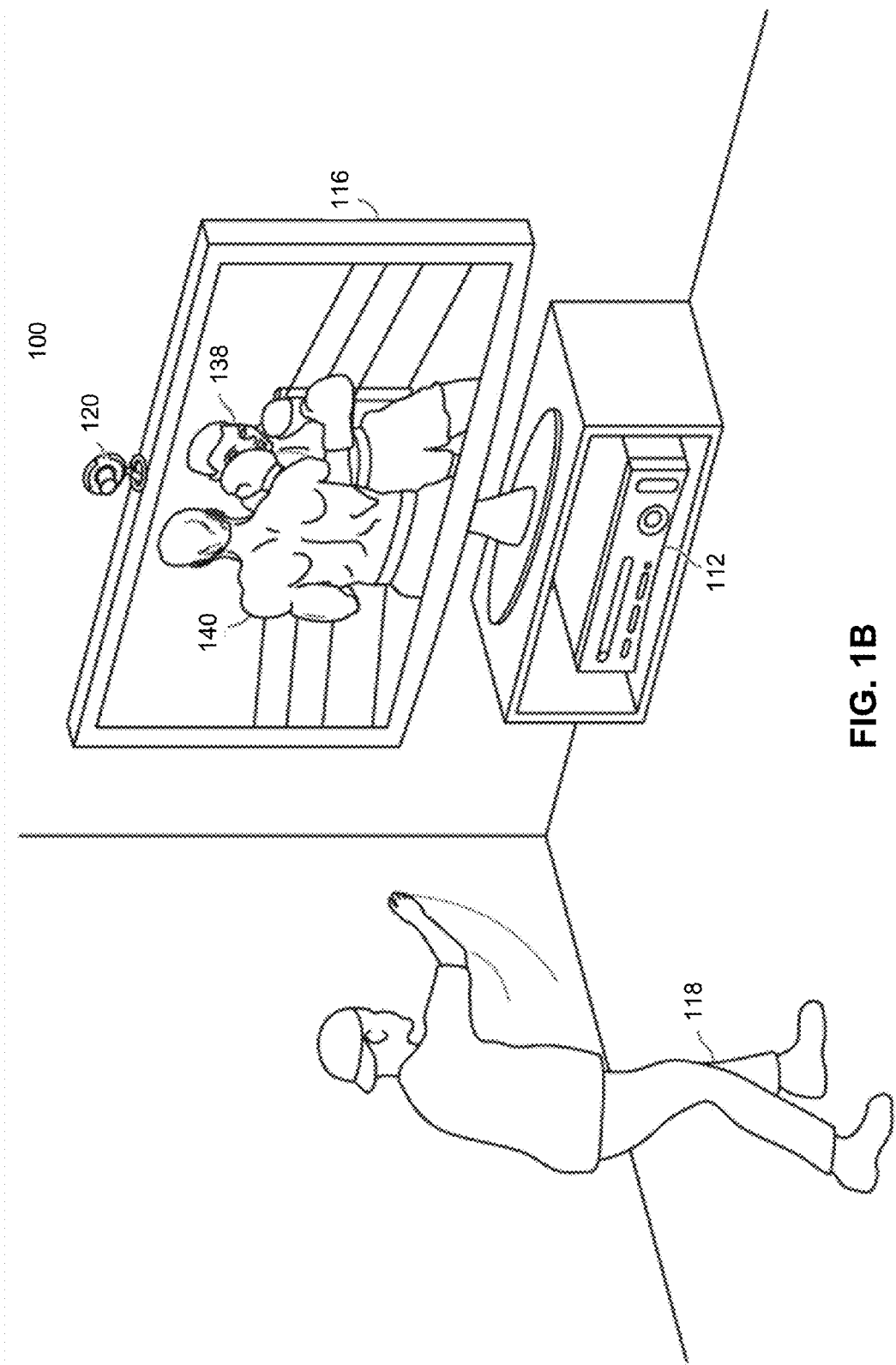

FIGS. 1A and 1B illustrate an example embodiment of a tracking system 100 with a user 118 playing a boxing video game. In an example embodiment, the tracking system 100 may be used to recognize, analyze, and/or track a human target such as the user 118 or other objects within range of the tracking system 100. As shown in FIG. 1A, the tracking system 100 includes a computing system 112 and a capture device 120. As will be describe in additional detail below, the capture device 120 can be used to obtain depth images and color images (also known as RGB images) that can be used by the computing system 112 to identify one or more users or other objects, as well as to track motion and/or other user behaviors. The tracked position, motion and/or other user behavior can be used to update an application. Therefore, a user can manipulate game characters or other aspects of the application by using movement of the user's body and/or objects around the user, rather than (or in addition to) using controllers, remotes, keyboards, mice, or the like. For example, a video game system can update the position of images displayed in a video game based on the new positions of the objects or update an avatar based on motion of the user.

The computing system 112 may be a computer, a gaming system or console, or the like. According to an example embodiment, the computing system 112 may include hardware components and/or software components such that computing system 112 may be used to execute applications such as gaming applications, non-gaming applications, or the like. In one embodiment, computing system 112 may include a processor such as a standardized processor, a specialized processor, a microprocessor, or the like that may execute instructions stored on a processor readable storage device for performing the processes described herein.

The capture device 120 may be, for example, a camera that may be used to visually monitor one or more users, such as the user 118, such that gestures and/or movements performed by the one or more users may be captured, analyzed, and tracked to perform one or more controls or actions within the application and/or animate an avatar or on-screen character, as will be described in more detail below.

According to one embodiment, the tracking system 100 may be connected to an audiovisual device 116 such as a television, a monitor, a high-definition television (HDTV), or the like that may provide game or application visuals and/or audio to a user such as the user 118. For example, the computing system 112 may include a video adapter such as a graphics card and/or an audio adapter such as a sound card that may provide audiovisual signals associated with the game application, non-game application, or the like. The audiovisual device 116 may receive the audiovisual signals from the computing system 112 and may then output the game or application visuals and/or audio associated with the audiovisual signals to the user 118. According to one embodiment, the audiovisual device 16 may be connected to the computing system 112 via, for example, an S-Video cable, a coaxial cable, an HDMI cable, a DVI cable, a VGA cable, component video cable, or the like.

As shown in FIGS. 1A and 1B, the tracking system 100 may be used to recognize, analyze, and/or track a human target such as the user 118. For example, the user 118 may be tracked using the capture device 120 such that the gestures and/or movements of user 118 may, be captured to animate an avatar or on-screen character and/or may be interpreted as controls that may be used to affect the application being executed by computing system 112. Thus, according to one embodiment, the user 118 may move his or her body to control the application and/or animate the avatar or on-screen character.

In the example depicted in FIGS. 1A and 1B, the application executing on the computing system 112 may be a boxing game that the user 118 is playing. For example, the computing system 112 may use the audiovisual device 116 to provide a visual representation of a boxing opponent 138 to the user 118. The computing system 112 may also use the audiovisual device 116 to provide a visual representation of a player avatar 140 that the user 118 may control with his or her movements. For example, as shown in FIG. 1B, the user 118 may throw a punch in physical space to cause the player avatar 140 to throw a punch in game space. Thus, according to an example embodiment, the computer system 112 and the capture device 120 recognize and analyze the punch of the user 118 in physical space such that the punch may be interpreted as a game control of the player avatar 140 in game space and/or the motion of the punch may be used to animate the player avatar 140 in game space.

Other movements by the user 118 may also be interpreted as other controls or actions and/or used to animate the player avatar (which can also be referred to as a user avatar), such as controls to bob, weave, shuffle, block, jab, or throw a variety of different power punches. Furthermore, some movements may be interpreted as controls that may correspond to actions other than controlling the player avatar 140. For example, in one embodiment, the player (which can also be referred to as a user) may use movements to end, pause, or save a game, select a level, view high scores, communicate with a friend, etc. According to another embodiment, the player may use movements to select the game or other application from a main user interface. Thus, in example embodiments, a full range of motion of the user 118 may be available, used, and analyzed in any suitable manner to interact with an application.

In example embodiments, the human target such as the user 118 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self propelled objects. In addition to boxing, other games can also be implemented.

According to other example embodiments, the tracking system 100 may further be used to interpret target movements as operating system and/or application controls that are outside the realm of games. For example, virtually any controllable aspect of an operating system and/or application may be controlled by movements of the target such as the user 118.

Figure 2A:
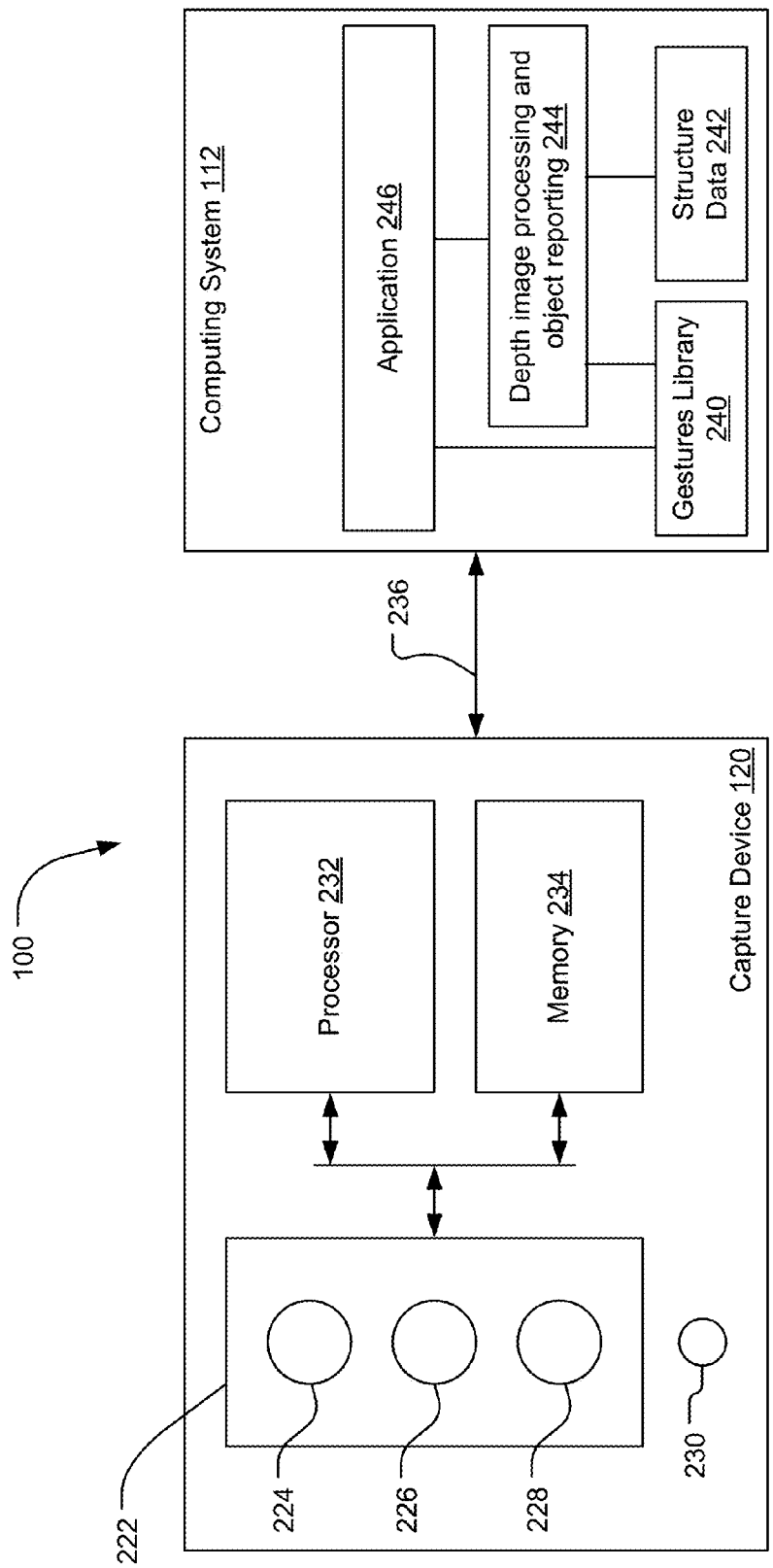
FIG. 2A illustrates an example embodiment of a capture device that may be used as part of the tracking system.

FIG. 2A illustrates an example embodiment of the capture device 120 that may be used in the tracking system 100. According to an example embodiment, the capture device 120 may be configured to capture video with depth information including a depth image that may include depth values via any suitable technique including, for example, time-of-flight, structured light, stereo image, or the like. According to one embodiment, the capture device 120 may organize the depth information into "Z layers," or layers that may be perpendicular to a Z axis extending from the depth camera along its line of sight.

As shown in FIG. 2A, the capture device 120 may include an image camera component 222. According to an example embodiment, the image camera component 222 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2A, according to an example embodiment, the image camera component 222 may include an infra-red (IR) light component 224, a three-dimensional (3-D) camera 226, and an RGB camera 228 that may be used to capture the depth image of a scene. For example, in time-of-flight analysis, the IR light component 224 of the capture device 120 may emit an infrared light onto the scene and may then use sensors (not shown) to detect the backscattered light from the surface of one or more targets and objects in the scene using, for example, the 3-D camera 226 and/or the RGB camera 228. In some embodiments, pulsed infrared light may be used such that the time between an outgoing light pulse and a corresponding incoming light pulse may be measured and used to determine a physical distance from the capture device 120 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 120 to a particular location on the targets or objects by analyzing the intensity of the reflected beam of light over time via various techniques including, for example, shuttered light pulse imaging.

In another example embodiment, the capture device 120 may use a structured light to capture depth information. In such an analysis, patterned light (i.e., light displayed as a known pattern such as grid pattern, a stripe pattern, or different pattern) may be projected onto the scene via, for example, the IR light component 224. Upon striking the surface of one or more targets or objects in the scene, the pattern may become deformed in response. Such a deformation of the pattern may be captured by, for example, the 3-D camera 226 and/or the RGB camera 28 and may then be analyzed to determine a physical distance from the capture device to a particular location on the targets or objects. In some implementations, the IR Light component 224 is displaced from the cameras 226 and 228 so triangulation can be used to determined distance from cameras 226 and 228. In some implementations, the capture device 120 will include a dedicated IR sensor to sense the IR light.

According to another embodiment, the capture device 120 may include two or more physically separated cameras that may view a scene from different angles to obtain visual stereo data that may be resolved to generate depth information. Other types of depth image sensors can also be used to create a depth image.

The capture device 120 may further include a microphone 130. The microphone 130 may include a transducer or sensor that may receive and convert sound into an electrical signal. According to one embodiment, the microphone 130 may be used to reduce feedback between the capture device 120 and the computing system 112 in the target recognition, analysis, and tracking system 100. Additionally, the microphone 30 may be used to receive audio signals that may also be provided by the user to control applications such as game applications, non-game applications, or the like that may be executed by the computing system 112.

In an example embodiment, the capture device 120 may further include a processor 232 that may be in operative communication with the image camera component 222. The processor 232 may include a standardized processor, a specialized processor, a microprocessor, or the like that may execute instructions including, for example, instructions for receiving a depth image, generating the appropriate data format (e.g., frame) and transmitting the data to computing system 112.

The capture device 120 may further include a memory component 234 that may store the instructions that may be executed by the processor 232, images or frames of images captured by the 3-D camera and/or RGB camera, or any other suitable information, images, or the like. According to an example embodiment, the memory component 234 may include random access memory (RAM), read only memory (ROM), cache, Flash memory, a hard disk, or any other suitable storage component. As shown in FIG. 2A, in one embodiment, the memory component 234 may be a separate component in communication with the image capture component 222 and the processor 232. According to another embodiment, the memory component 234 may be integrated into the processor 232 and/or the image capture component 222.

As shown in FIG. 2A, the capture device 120 may be in communication with the computing system 212 via a communication link 236. The communication link 236 may be a wired connection including, for example, a USB connection, a Firewire connection, an Ethernet cable connection, or the like and/or a wireless connection such as a wireless 802.11b, g, a or n connection. According to one embodiment, the computing system 112 may provide a clock to the capture device 120 that may be used to determine when to capture, for example, a scene via the communication link 236. Additionally, the capture device 120 provides the depth images and color images captured by, for example, the 3-D camera 226 and/or the RGB camera 228 to the computing system 112 via the communication link 236. In one embodiment, the depth images and color images are transmitted at 30 frames per second. The computing system 112 may then use the model, depth information, and captured images to, for example, control an application such as a game or word processor and/or animate an avatar or on-screen character.

Computing system 112 includes gestures library 240, structure data 242, depth image processing and object reporting module 244 and application 246. Depth image processing and object reporting module 244 uses the depth images to track positions and/or motion of objects, such as the user and other objects. To assist in the tracking of the objects, depth image processing and object reporting module 244 uses gestures library 240 and structure data 242.

Structure data 242 includes structural information about objects that may be tracked. For example, a skeletal model of a human may be stored to help understand movements of the user and recognize body parts. Structural information about inanimate objects may also be stored to help recognize those objects and help understand movement.

Gestures library 240 may include a collection of gesture filters, each comprising information concerning a gesture that may be performed by the skeletal model (as the user moves). The data captured by the cameras 226, 228 and the capture device 120 in the form of the skeletal model and movements associated with it may be compared to the gesture filters in the gesture library 240 to identify when a user (as represented by the skeletal model) has performed one or more gestures. Those gestures may be associated with various controls of an application. Thus, the computing system 112 may use the gestures library 240 to interpret movements of the skeletal model and to control application 246 based on the movements. As such, gestures library may be used by depth image processing and object reporting module 244 and application 246.

Application 246 can be a video game, productivity application, etc. In one embodiment, depth image processing and object reporting module 244 will report to application 246 an identification of each object detected and the location of the object for each frame. Application 246 will use that information to update the position or movement of an avatar or other images in the display.

Figure 2B:
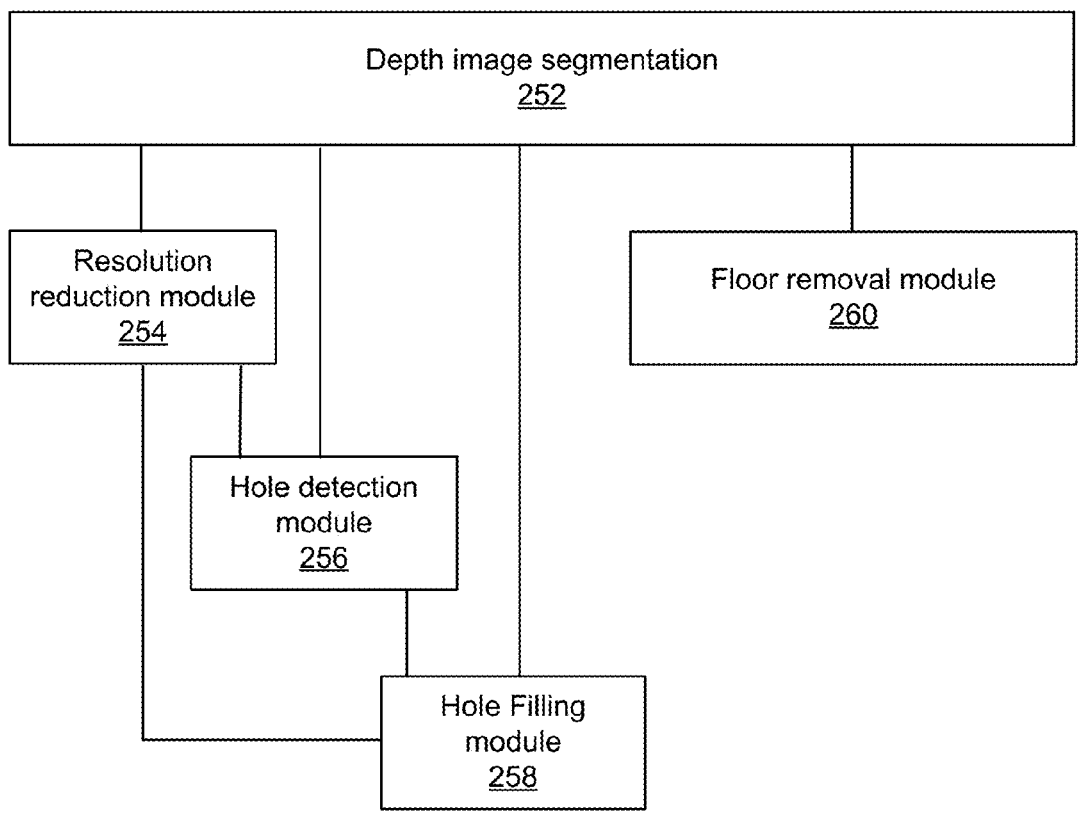
FIG. 2B illustrates an example embodiment of the depth image processing and object reporting module introduced in FIG. 2A.

FIG. 2B illustrates an example embodiment of the depth image processing and object reporting module 244 introduced in FIG. 2A. Referring to FIG. 2B, the depth image processing and object reporting module 244 is shown as including a depth image segmentation module 252, a resolution reduction module 254, a hole detection module 256, a hole filling module 258, and a floor removal module 260. In an embodiment, the depth image segmentation module 252 is configured to detect one or more users (e.g., human targets) within a depth image, and associates a segmentation value with each pixel. Such segmentation values are used to indicate which pixels correspond to a user. For example, a segmentation value of 1 can be assigned to all pixels that correspond to a first user, a segmentation value of 2 can be assigned to all pixels that correspond to a second user, and an arbitrary predetermined value (e.g., 255) can be assigned to the pixels that do not correspond to a user. It is also possible that segmentation values can be assigned to objects, other than users, that are identified within a depth image, such as, but not limited to, a tennis racket, a jump rope, a ball, a floor, or the like. In an embodiment, as a result of a segmentation process performed by the depth image segmentation module 252, each pixel in a depth image will have four values associated with the pixel, including: an x-position value (i.e., a horizontal value); a y-position value (i.e., a vertical value); a z-position value (i.e., a depth value); and a segmentation value, which was just explained above. In other words, after segmentation, a depth image can specify that a plurality of pixels correspond to a user, wherein such pixels can also be referred to as a subset of pixels specified as corresponding to a user, or as a depth image silhouette of a user. Additionally, the depth image can specify, for each of the subset of pixels corresponding to the user, a pixel location and a pixel depth. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel.

Still referring to FIG. 2B, in an embodiment, the resolution reduction module 254 is used to produce a lower resolution representation of a user included in a depth image that respects the shape of the user and does not smooth distinct body parts of the user, yet is not a mirror image of the user. The hole detection module 256 is used to detect holes in the pixels of a depth image that resulted from a portion of the user occluding another portion of the user when a capture device (e.g., 120) was used to obtain a depth image. The hole filling module 258 is used for hole filling detected holes. The floor removal module 260 is used to remove, from a subset of pixels specified as corresponding to a user, those pixels that likely correspond to a floor supporting the user. Additional details relating to producing a lower resolution representation of a user included in a depth image are described below with reference to FIGS. 7 and 8. Additional details relating to identifying and filling holes in a subset of pixels of a depth image that correspond to a user are described below with reference to FIGS. 7 and 9-12B. Additional details relating to floor removal techniques are described below with reference to FIG. 13. The depth image processing and object report modules 244 can also include additional modules which are not specifically described herein.

Figure 3:
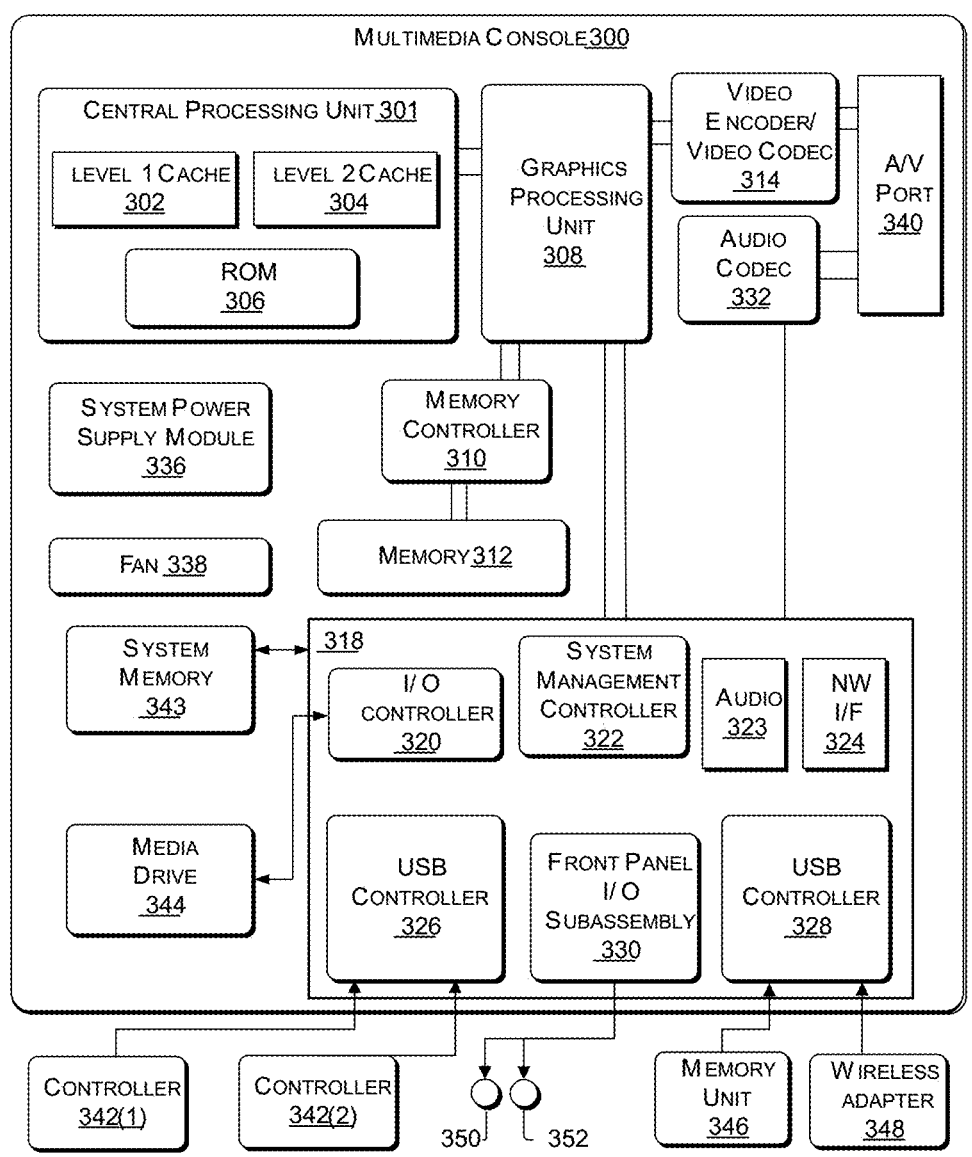
FIG. 3 illustrates an example embodiment of a computing system that may be used to track user behavior and update an application based on the user behavior.

FIG. 3 illustrates an example embodiment of a computing system that may be the computing system 112 shown in FIGS. 1A-2B used to track motion and/or animate (or otherwise update) a representation of an actual user, an avatar or other on-screen object displayed by an application. The computing system such as the computing system 112 described above with respect to FIGS. 1A-2 may be a multimedia console, such as a gaming console. As shown in FIG. 3, the multimedia console 300 has a central processing unit (CPU) 301 having a level 1 cache 102, a level 2 cache 304, and a flash ROM (Read Only Memory) 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec 314 form a video processing pipeline for high speed and high resolution graphics processing. Data is carried from the GPU 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM (Random Access Memory).

The multimedia console 300 includes an I/O controller 320, a system management controller 322, an audio processing unit 323, a network interface 324, a first USB host controller 326, a second USB controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, Blu-Ray drive, hard disk drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button. 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 226, 228 and capture device 120 may define additional input devices for the console 300 via USB controller 326 or other interface.

Figure 4:
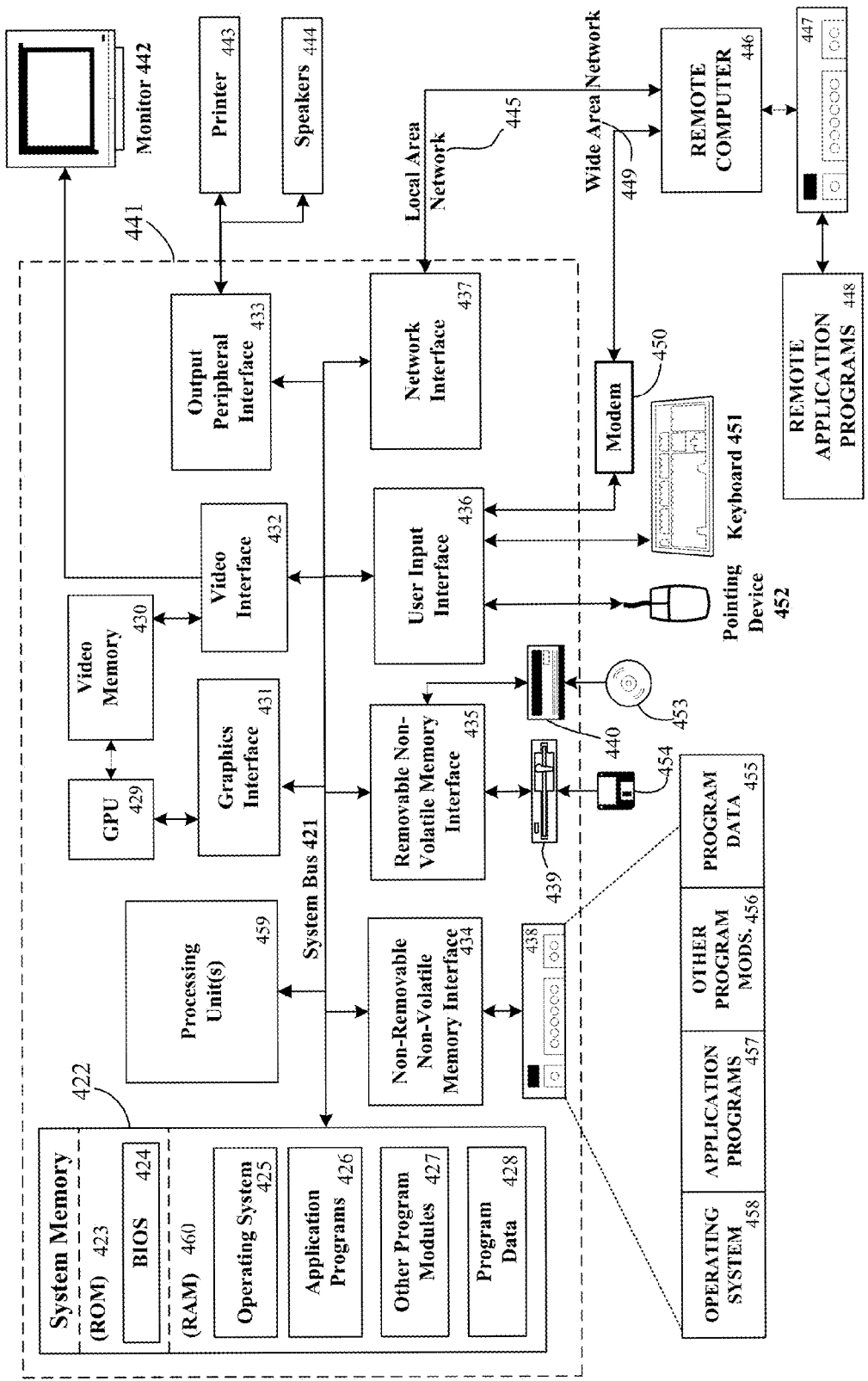
FIG. 4 illustrates another example embodiment of a computing system that may be used to track user behavior and update an application based on the tracked user behavior.

FIG. 4 illustrates another example embodiment of a computing system 420 that may be the computing system 112 shown in FIGS. 1A-2B used to track motion and/or animate (or otherwise update) a representation of an actual user, an avatar or other on-screen object displayed by an application. The computing system 420 is only one example of a suitable computing system and is not intended to suggest any limitation as to the scope of use or functionality of the presently disclosed subject matter. Neither should the computing system 420 be interpreted as having any dependency or requirement relating to any one or combination of components illustrated in the exemplary computing system 420. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 226, 228 and capture device 120 may define additional input devices for the computing system 420 that connect via user input interface 436. A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433. Capture Device 120 may connect to computing system 420 via output peripheral interface 433, network interface 437, or other interface.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates application programs 448 as residing on memory device 447. It will be appreciated that the network connections shown are exemplary and other means of establishing a communications link between the computers may be used.

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

As mentioned above, skeletal tracking (ST) techniques are often used to detect and produce a representation of a user for display, as well as to detect user behaviors. However, while useful for detecting and displaying representations of users in certain situations, ST techniques have proven to be unreliable for detecting and displaying representations of users in other situations. For example, ST techniques are typically unreliable for detecting and displaying representations of a user where the user is laying or sitting on or near the floor. Certain embodiments described herein rely on depth images to detect and display representations of a user and/or to detect user behaviors. Accordingly, before discussing such embodiments in additional detail, it would first be useful to provide additional details of depth images.

Figure 5:
FIG. 5 illustrates an exemplary depth image.

FIG. 5 illustrates an example embodiment of a depth image that may be received at computing system 112 from capture device 120. According to an example embodiment, the depth image may be an image and/or frame of a scene captured by, for example, the 3-D camera 226 and/or the RGB camera 228 of the capture device 120 described above with respect to FIG. 2A. As shown in FIG. 5, the depth image may include a human target corresponding to, for example, a user such as the user 118 described above with respect to FIGS. 1A and 1B and one or more non-human targets such as a wall, a table, a monitor, or the like in the captured scene. As described above, the depth image may include a plurality of observed pixels where each observed pixel has an observed depth value associated therewith. For example, the depth image may include a two-dimensional (2-D) pixel area of the captured scene where each pixel at particular x-value and y-value in the 2-D pixel area may have a depth value such as a length or distance in, for example, centimeters, millimeters, or the like of a target or object in the captured scene from the capture device. In other words, as explained above in the discussion of FIG. 2B, a depth image can specify, for each of the pixels in the depth image, a pixel location and a pixel depth. Following a segmentation process, e.g., performed by the by the depth image processing and object reporting module 244, each pixel in the depth image can also have a segmentation value associated with it. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. The segmentation value is used to indicate whether a pixel corresponds to a specific user, or does not correspond to a user.

In one embodiment, the depth image may be colorized or grayscale such that different colors or shades of the pixels of the depth image correspond to and/or visually depict different distances of the targets from the capture device 120. Upon receiving the image, one or more high-variance and/or noisy depth values may be removed and/or smoothed from the depth image; portions of missing and/or removed depth information may be filled in and/or reconstructed; and/or any other suitable processing may be performed on the received depth image.

FIG. 6 provides another view/representation of a depth image (not corresponding to the same example as FIG. 5). The view of FIG. 6 shows the depth data (i.e., z-position values) for each pixel as an integer that represents the distance of the target to capture device 120 for that pixel. The example depth image of FIG. 6 shows 24×24 pixels; however, it is likely that a depth image of greater resolution would be used. Each of the pixels in FIG. 6 that is represented by a z-position value can also include an x-position value, a y-position value, and a segmentation value. For example, the pixel in the left uppermost corner can have an x-position value=1, and a y-position value=1; and the pixel in the left lowermost corner can have an x-position value=1, and a y-position value=24 . Segmentation values, as mentioned above, are used to indicate which pixels correspond to a user. Such segmentation values can be stored in another image or buffer, referred to as a segmentation image or buffer, or can be stored within the depth image. Either way, information that specifies that a subset of pixels within the depth image correspond to a user is available for use when analyzing or otherwise processing or operating on a depth image.

Figure 7:
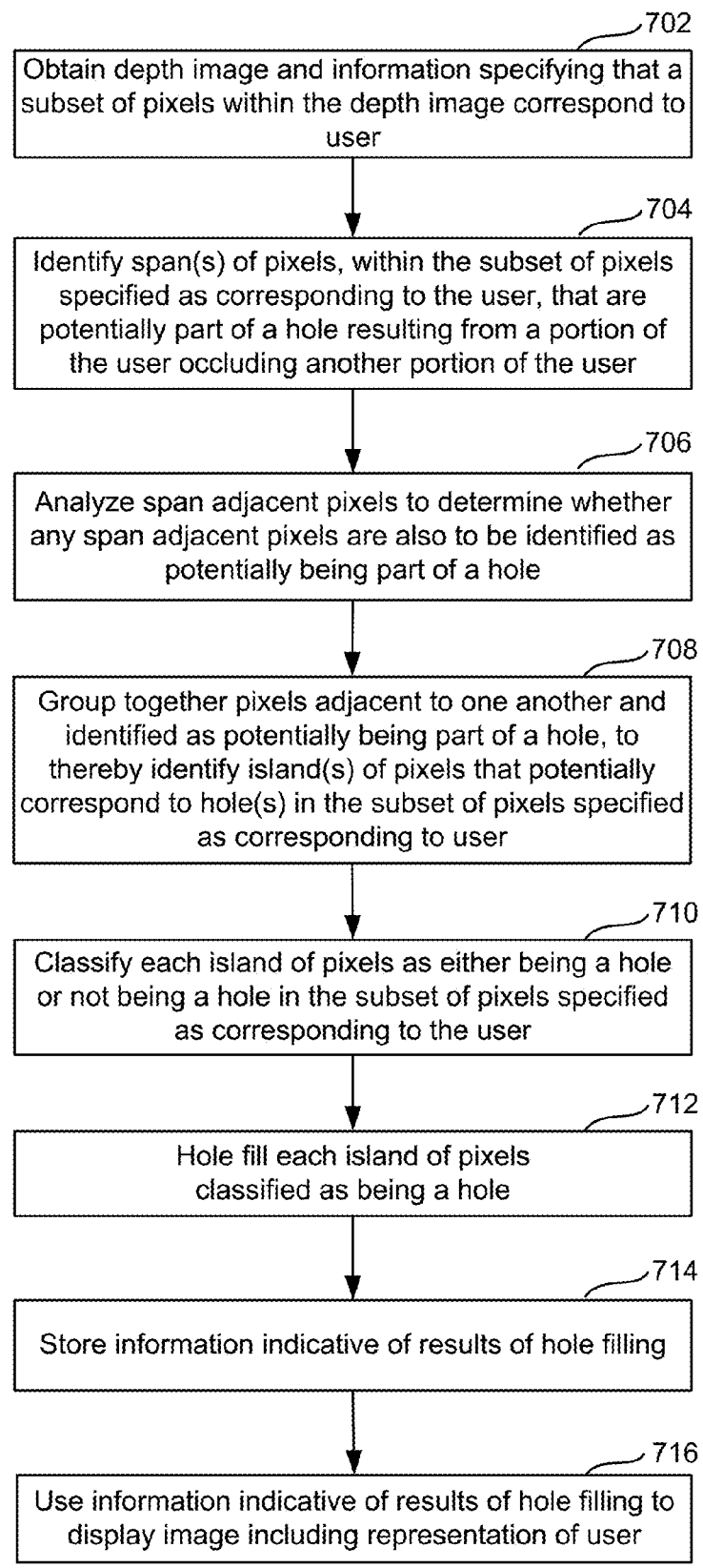
FIG. 7 illustrate a high level flow diagram that is used to summarize methods for identifying holes and filling holes within a depth image, according to certain embodiments.

The high level flow diagram of FIG. 7 will now be used to summarize methods for identifying holes and filling holes within a depth image, according to certain embodiments. In specific embodiments, such methods are for use for identifying and filling holes that are only within the subset of pixels (within the depth image) that correspond to a user. By limiting the identifying of holes to the subset of pixels that correspond to the user, it is less likely that filling of the identified holes will bleed beyond the silhouette of the user represented in the depth image, which would be undesirable.

Referring to FIG. 7, at step 702, a depth image and information that specifies that a subset of pixels within the depth image correspond to a user are obtained. As mentioned above, such information (that specifies that a subset of pixels within the depth image correspond to a user), which can also be referred to segmentation information, can be included in the depth image or can be obtained from a segmentation image or buffer that is separate from the depth image. The depth image obtained at step 702 can be the original depth image obtained using a capture device (e.g., 120) located a distance from the user. Alternatively, the depth image obtained at step 702 may have already undergone certain preprocessing. For example, in certain embodiments the resolution of the original depth image (obtained using the capture device) is reduced to a lower resolution depth image, and the lower resolution depth image (which can simply be referred to as a low resolution depth image) is what is obtained at step 702. Additional details of how to generate such a low resolution depth image, in accordance with certain embodiments, are described below with reference to FIG. 8.

The depth image and information obtained at step 702 can specify, for each of the subset of pixels corresponding to the user, a pixel location and a pixel depth. As mentioned above, in the discussion of FIG. 2B, a pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. For the purpose of this description it is assumed that the depth image received at step 702 has already been subject to a segmentation process that determined which pixels correspond to a user, and which pixels do not correspond to a user. Alternatively, if the depth image received at step 702 has not yet been through a segmentation process, the segmentation process can occur between steps 702 and 704.

Steps 704-710, which are discussed in further detail below, are used to identify holes (within the subset of pixels within the depth image correspond to a user) so that such holes can be filled at step 712. As will be described below, certain steps are used to identify pixels that are potentially part of a hole, while another step classifies groups of pixels (identified as potentially being part of a hole) as either a hole or not a hole. Pixels that are identified as potentially being part of a hole, but are not actually part of a hole, can be referred to as false positives. Pixels that are not identified as potentially being part of a hole, but are actually part of a hole, can be referred to as false negatives. As will be appreciated from the following discussion, embodiments described herein can be used to reduce both false positives and false negatives.

At step 704, one or more spans of pixels are identified, within the subset of pixels specified as corresponding to the user, that are potentially part of a hole. Such holes often result from a portion of the user occluding another portion of the user when a capture device (e.g., 120) was used to obtain the depth image. Each identified span can be either a horizontal span, or a vertical span. In accordance with an embodiment, each horizontal span has a vertical height of one pixel, and a horizontal width of at least a predetermined number of pixels (e.g., 5 pixels). In accordance with an embodiment, each vertical span has a vertical height of at least a predetermined number of pixels (e.g., 5 pixels) and a horizontal width of one pixel. As will be appreciated from the discussion below, identification of such spans are useful for identifying boundaries of potential holes within the subset of pixels specified as corresponding to the user. Additional details of step 704, according to an embodiment, are described below with reference to FIG. 9.

Between steps 704 and 706, spans that are likely mislabeled as potentially being part of a hole may identified and reclassified as not potentially being part of a hole. For example, in an embodiment, any span that exceeds a predetermine width or a predetermined length can be reclassified as no longer being identified as potentially being part of a hole. For example, it may be heuristically determined that a user represented in a depth image will likely be represented by a certain number of pixels in height, and a certain number of pixels in width. If an identified span has a height that is greater than the expected height of the user, that span can be reclassified as no longer being identified as potentially being part of a hole. Similarly, if an identified span has a width that is greater than the expected width of the user, that span can be reclassified as no longer being identified as potentially being part of a hole. Additionally, or alternatively, where information is available regarding which pixels likely correspond to which parts of the user's body, spans that are within or close to body parts that heuristically have been found to be frequently mislabeled as holes, can be reclassified as no longer being identified as potentially being part of a hole. Information regarding which pixels likely correspond to which body parts can be obtained from structure data (e.g., 242), but is not limited thereto. For a more specific example, pixels that correspond to lower-limbs oriented toward the capture device have been found to be often mislabeled as holes. In certain embodiments, if it is determined than identified span is part of the user's lower limbs, that span can be reclassified as no longer being identified as potentially being part of a hole.

At step 706, span adjacent pixels are analyzed to determine whether one or more span. adjacent pixels are also to be identified as potentially being part of a hole in the subset of pixels specified as corresponding to the user. A span adjacent pixel, as the terms is used herein, refers to a pixel that is adjacent to at least one of the horizontal or vertical spans identified at step 704. This step is used to identify pixels that are potentially part of a hole but were not identified at step 704. Accordingly, this step is used to reduce potential false negatives. In other words, this step is used to identify pixels that should be identified as potentially being part of a hole, but were not included in one of the spans identified at step 704. Additional details of step 706, according to an embodiment, are described below with reference to FIG. 10.

At step 708, pixels that are adjacent to one another and have been identified as potentially being part of a hole (in the subset of pixels specified as corresponding to the user) are grouped together into islands of pixels that potentially correspond to one or more holes (in the subset of pixels specified as corresponding to the user). Step 708 can be performed, e.g., using a flood fill algorithm (also known as a seed fill), but is not limited thereto. In certain embodiments, each pixel that is considered part of a common island is assigned a common island value. For example, all pixels considered part of a first island can be assigned an island value of 1, and all pixels considered part of a second island can be assigned an island value of 2, and so on.

At step 710, each of the identified island of pixels (in the subset of pixels specified as corresponding to the user) are classified as either being a hole or not being a hole. Accordingly, this step is used to remove any false positives that may have remained following the earlier performed steps. Additional details of step 710, according to an embodiment, are described below with reference to FIG. 11.

At step 712, hole filling (also known as image completion or image inpainting) is separately performed on each island of pixels classified as being a hole. Various different types of hole filling can be performed. In certain embodiments, scattered data interpolation is used to perform the hole filling. This can include, for example, for each individual island of pixels classified as being a hole, concurrently solving the Laplacian on each pixel of the island, and treating pixels identified as boundary points as being the boundary problem for the solution. More specifically, a sparse system of equations can be built based on the pixels of an island classified as a hole, setting the Laplacian of the non-boundary points to zero, and the boundary points to themselves. Using a Gauss-Seidel solver with successive over-relaxation (e.g., 1.75), reliable hole filling can be achieved after multiple iterations. Alternatively, a Jacobi solver can be used in place of the Gauss-Seidel solver to parallelize equation solving. In another embodiment, a radial basis function (RBF) can be used to perform the hole filling. Other types of scattered data interpolation techniques can alternatively be used for hole filling. Further, alternative types of hole filling techniques can be used besides scatter data interpolation based techniques.

At step 714, information indicative of the results of the hole filling are stored (e.g., in memory 312 or 422). For example, such information can be stored as an array of depth values that is separate from, but for use with, the depth image obtained at step 712. Alternatively, the depth image can be modified so that the depth value for each pixel identified as being part of a hole is replaced with the corresponding depth value resulting from the hole filling. Either way, the results of the hole filling process are available for use when displaying a representation of the user, as indicated at step 716. Before displaying such a representation of the user, the depth values in the depth image can be converted from depth image space to camera space using known transformation techniques. For example, by knowing the geometric optics of the capture device (e.g., 120) used to obtain the depth image (or a higher resolution version thereof), the camera space position for each pixel in a depth image, along with all of the filled depth values for the holes, can be computed. Numerical differentiation can then be used to estimate each pixel's normal, and thus, an orientation of a surface. In accordance with specific embodiments, in order to reduce jitter in the representation of the user (included in a displayed image), camera space positions corresponding to a frame are temporarily stored so that the camera space positions corresponding to a frame can be compared to the positions corresponding to the immediately preceding frame. Each pixel's position can then be compared to its position in the immediately preceding frame to determine whether a distance there-between (i.e., a change in position) exceeds a specified threshold. If the threshold is not exceeded, when a representation of the user is displayed, the position of that pixel in the displayed representation of the user is not changed relative to the preceding frame. If the threshold is exceeded, then the position of the pixel in the displayed representation of the user is changed relative to the preceding frame. By only changing positions of a pixel in a displayed representation of a user when its change in position exceeds the specified threshold, jitter (e.g., resulting from noise associated with the capture device used to obtain the depth image) in the displayed representation of the user is reduced.

Additional details of specific steps discussed above with reference to FIG. 7 will now be described below with reference to FIGS. 8-11.

Figure 8:
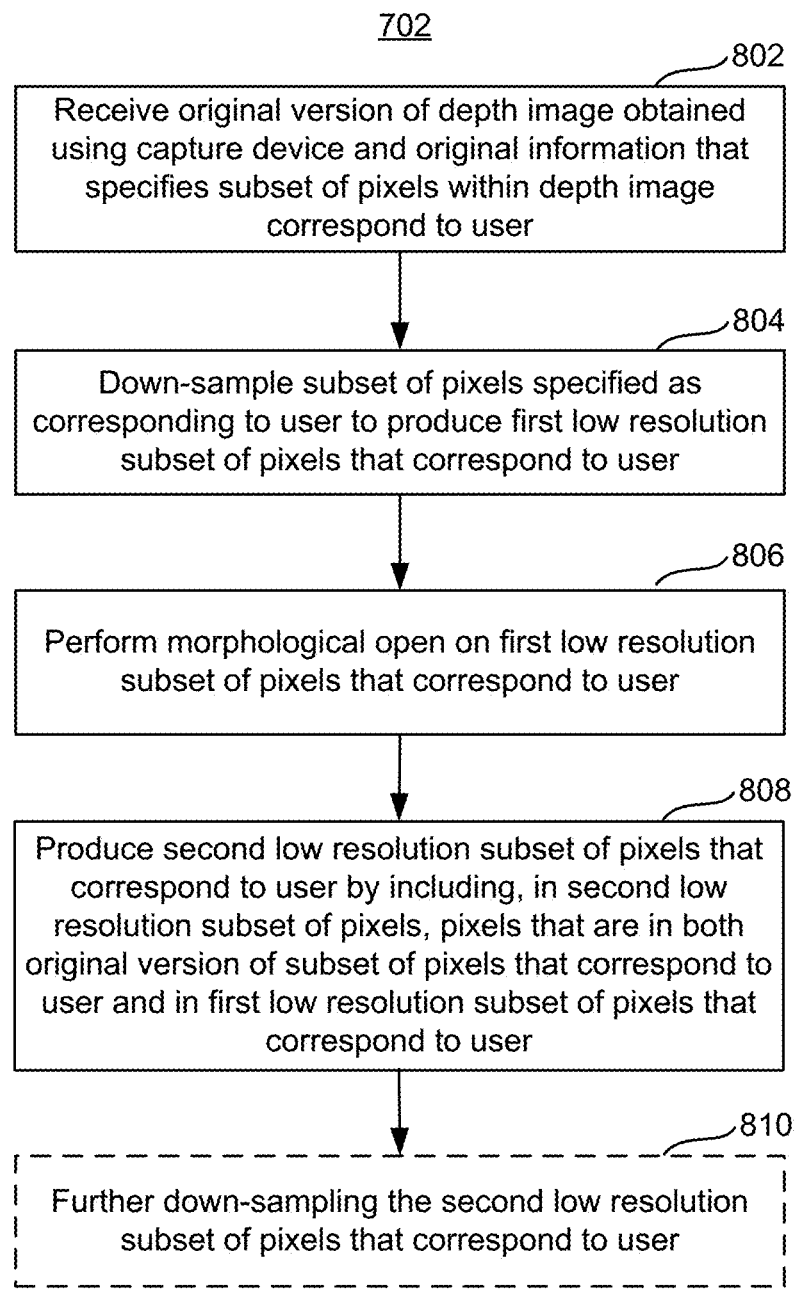
FIG. 8 illustrates a flow diagram that is used to provide additional details of step 702 in FIG. 7, according to an embodiment.

FIG. 8 illustrates a flow diagram that is used to provide additional details of step 702 in FIG. 7, according to certain embodiments. More specifically, FIG. 8 is used to describe how to produce a low resolution version of a subset of pixels that has been specified as corresponding to a user, so that when a representation of the user is displayed, the image respects the shape of the user and does not smooth distinct body parts of the user, yet is not a mirror image of the user. A capture device (e.g., 120) is used to obtain an original version of a depth image that has an original resolution, e.g., 320×240 pixels, but not limited thereto. Further, the depth image segmentation module 252 is used to specify which subset of pixels, within the original depth image, correspond to a user. Such a subset of pixels can be used to display an image that includes a relatively accurate representation of the user. However, depending upon the application, it may be more desirable to display an image that includes a less accurate representation of the user, yet still, respects the overall shape of the user and does not smooth out distinct body parts. For example, where an application displays a representation of a user performing certain exercises that the user is instructed to perform, it may be undesirable to display an accurate representation of a user that is overweight or gangly. This is because some people would prefer not to look at a relatively accurate mirror image of themselves while exercising. Accordingly, certain embodiments of the present technology, which shall now be described with reference to FIG. 8, are related to techniques for producing a lower resolution version of a subset of pixels that correspond to a user.

Referring to FIG. 8, step 802 involves receiving an original version of a depth image (obtained using a capture device located a distance from a user) and original information that specifies that a subset of pixels within the depth image correspond to a user. Step 804 involves down-sampling the subset of pixels within the original depth image that are specified as corresponding to the user to produce a first low resolution subset of pixels that correspond to the user. For example, the down-sampling may reduce the resolution of a depth image from 320×240 pixels to 80×60 pixels, but is not limited thereto. In an embodiment, when performing the down-sampling each of a plurality of blocks of higher resolution pixels is replaced with a single lower resolution pixel. For example, each block of 4×4 pixels, of an original depth image including 320×240 pixels, can be replaced by a single pixel to produce a lower resolution depth image including 80×60 pixels. This is just an example, which is not meant to be limiting. Further, it should be noted that each block of the higher resolution pixels need not be the same size. In certain embodiments, when performing the down-sampling, for each block of higher resolution pixels (e.g., each 4×4 block), one of the pixels (in the block of higher resolution pixels) is specifically or arbitrarily selected and compared to its neighboring pixels to produce the single pixel that is to replace the block of higher resolution pixels in the lower resolution depth image. In specific embodiments, this is done by replacing the selected pixel with a weighted sum of its neighboring pixels. For example, the following equation can be used to replace a depth image pixel value with a weighted sum value (i.e., a newvalue) of its neighboring pixels:

$$newvalue = \frac{1}{totalweight} \sum_{\substack{all\ neighbors \\ of\ input}} weight(input, neighbor) \times value(neighbor)$$

$$totalweight = \sum_{\substack{all\ neighbors \\ of\ input}} weight(input, neighbor)$$

Conventional image filtering (like a blur), typically specifies the weight as being a function of distance between the input pixel and the neighbor pixels, i.e., (with input location and neighbor location abbreviated to i and n), as expressed below:

$$weight(i, n) = spatialweight(i, n) = e^{-distance(i,n)}$$

The above is effectively a Gaussian filter.

In accordance specific embodiments, a trilateral down-sampling approach is used when replacing a block of pixels (in the original version of the depth image) with a weighted sum of a selected one of the pixels' (of the block of pixels) neighboring pixels, wherein the trilateral, down-sampling uses three weighting factors to produce the weighted sum. These three weighting factors include a spatial weighting factor indicative of a distance between the pixel and a neighboring pixel, a depth weighting factor indicative of whether a difference between a depth value of the pixel and a depth value of a neighboring pixel is less than a threshold, and a segmentation weighting factor indicative of whether a neighboring pixel is within the subset of pixels specified as corresponding to the user. The three weighting factors can be expresses as three separate functions, including:

$$weight(i, n) = spatialweight(i, n) \times depthweight(i, n) \times segmentationweight(i, n)$$

$$depthweight(i, n) = \begin{cases} 1, & depthbuffer(i) - depthbuffer(n) < \text{depth\_threshold} \\ 0, & \text{otherwise} \end{cases}$$

$$segmentationweight(i, n) = \begin{cases} 1, & segmentationbuffer(i) = segmentationbuffer(n) \\ 0, & \text{otherwise} \end{cases}$$

The spatialweight is used to filter (e.g., smoothen) the image. The depthweight ensures the smoothening does not cross boundaries where the depth in the image changes dramatically. For example, consider a user with their arm stretched in front of them. The depth corresponding to a pixel on the hand would differ dramatically from a pixel on the chest. To preserve the edge between the hand and the chest, filtering should not cross that boundary between the hand and the chest. The segmentationweight ensures that smoothening does not cross the boundary between the user and the background scene. Without the segmentationweight; the user's depth values may blend into a background environment at the edges of the user.

Additionally, for each lower resolution pixel, information indicative of the coverage of the lower resolution pixel can be determined and stored, wherein the information indicative of the coverage of the lower resolution pixel is indicative of the percentage of the high-resolution pixels (corresponding to the lower-resolution pixel) that were specified as corresponding to the user.

The first low resolution subset of pixels that correspond to the user, which is produced at step 804, can occasionally include spurious pixels that are mistakenly specified as corresponding to the user. To remove these spurious pixels, a morphological open can be performed on the first low resolution subset of pixels that correspond to the user, as indicated at step 806. To preserve an accurate silhouette of the player, a second low resolution subset of pixels that correspond to the user is produced, at step 808, by including (in the second low resolution subset of pixels that correspond to the user) pixels that are in both the original version of the subset of pixels that correspond to the user and in the first low resolution subset of pixels that correspond to the use. For example, step 808 can be performed by using a binary AND operation to mask results of the morphological open with the original version of the subset of pixels that correspond to the user.

This second low resolution subset of pixels that correspond to the user can be the subset within which spans are identified at step 704. Alternatively, the second low resolution subset of pixels can be further filtered using a trilateral filtering approach similar to the one described above with reference to step 804 (but without performing any further resolution reduction) and the resulting low resolution subset of pixels that correspond to the user can be the subset within which spans are identified at step 704. It is also possible that alternative types of down-sampling can be performed at or prior to step 702, or that no down-sampling at all be used.

In other words, in certain embodiments, the depth image obtained at step 702 need not have been reduced in resolution, and thus, the steps described with reference to FIG. 8 need not be performed.

Figure 9:
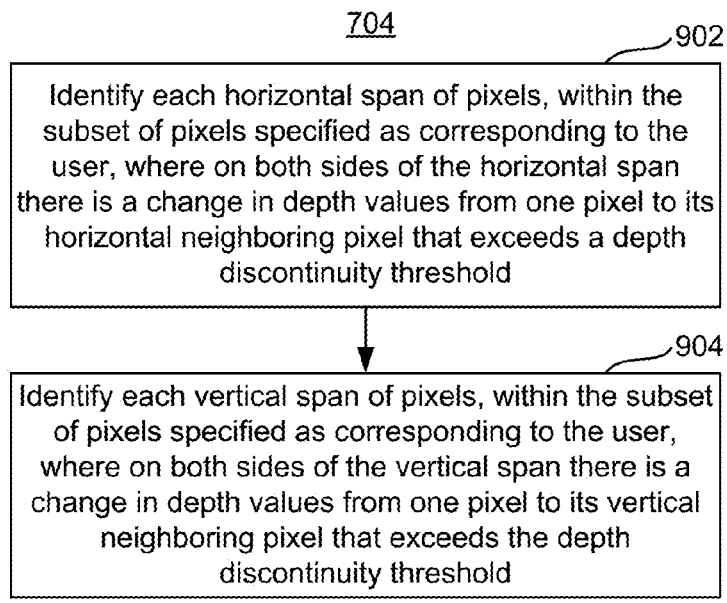
FIG. 9 illustrates a flow diagram that is used to provide additional details of step 704 on FIG. 7, according to an embodiment.

FIG. 9 will now be used to explain additional details of how to identify, at step 704, one or more spans of pixels that are potentially part of a hole in the subset of pixels corresponding to the user. In general, it is desirable to detect the boundaries of each potential hole. In accordance with specific embodiments, this is accomplished by identifying each horizontal span of pixels (within the subset of pixels specified as corresponding to the user) where on both sides of the horizontal span there is a change in depth values from one pixel to its horizontal neighboring pixel that exceeds a depth discontinuity threshold, as indicated at step 902. Additionally, this is accomplished by identifying each vertical span of pixels (within the subset of pixels specified as corresponding to the user) where on both sides of the vertical span there is a change in depth values from one pixel to its vertical neighboring pixel that exceeds the depth discontinuity threshold. More generally, there is a search for sufficiently large depth discontinuities in each of the two directions. Since an occluding body part is necessarily closer the capture device (e.g., 120) than the occluded body part, depth discontinuities with a positive delta (that exceed the threshold) are identified as a starting point of a potential hole, and depth discontinuities with a negative delta (that exceed the threshold) are identified as an ending point of a potential hole.

In specific embodiments, to identify the vertical spans of pixels that are potentially part of a hole, the subset of pixels specified as corresponding to the user can be analyzed column-by-column to identify any two consecutive pixels whereby the second pixel was closer to the first pixel by a value greater than depth discontinuity threshold. This can be stored as a potential start point of a span, and any subsequent start points can replace the previous. Since there is no need to fill multiple layers, there is no need to store a history of start points. A potential end point of a span can be identified by identifying two consecutive pixels whereby the second pixel was farther than the first by greater than the same threshold, with any subsequent end points replacing the previous. The pixels between the start and end points of a span are identified as potentially being part of a hole. Additionally, for each pair of consecutive pixels (identified as having depth values that exceeded the depth discontinuity threshold), the "farther" of the two pixels is identified as a boundary of a potential hole (and thus, can also be referred to as a potential hole boundary). To identify the horizontal spans of pixels that are potentially part of a hole (and to identify further potential hole boundaries), a similar process to the just described process for identifying vertical spans is performed, except that there is a row-by-row (rather than column-by-column) analysis of the subset pixels specified as corresponding to the user.

Figure 10:
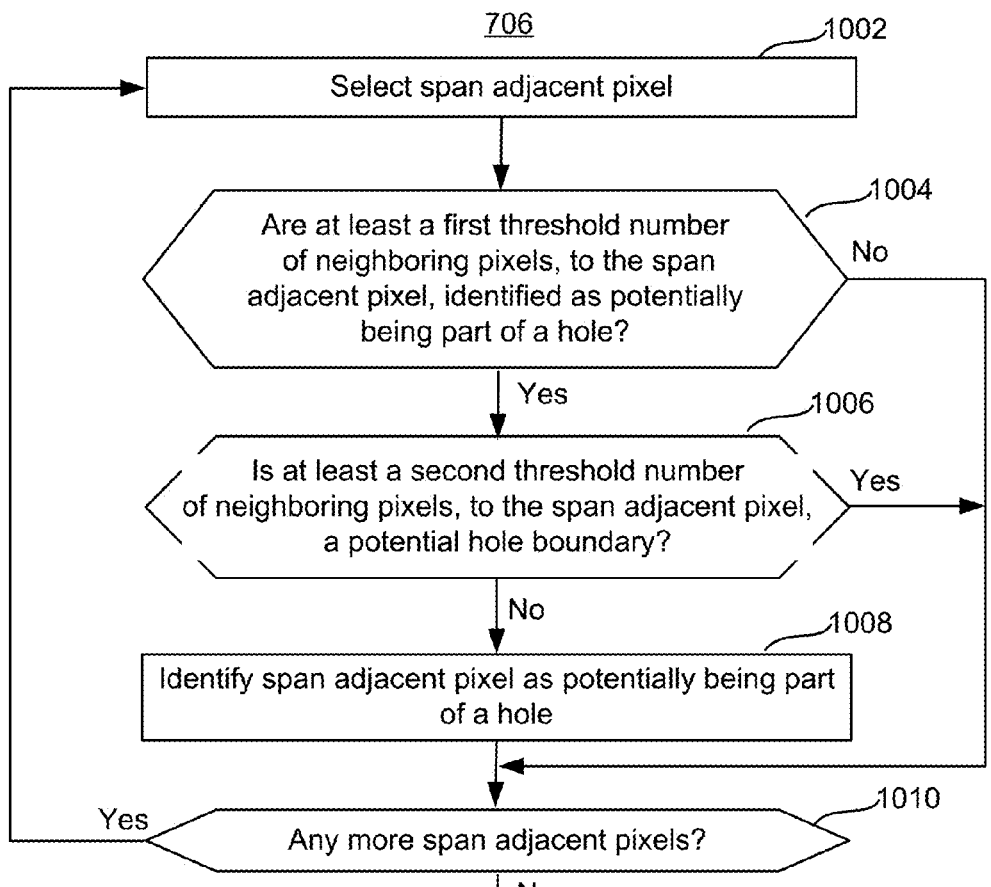
FIG. 10 illustrates a flow diagram that is used to provide additional detail of step 706 in FIG. 7, according to an embodiment.

FIG. 10 will now be used to explain how, at step 706, span adjacent pixels are analyzed to determine whether one or more span adjacent pixels are also to be identified as potentially being part of a hole in the subset of pixels specified as corresponding to the user. Referring to FIG. 10, at step 1002, a span adjacent pixel is selected for analysis. As mentioned above, a span adjacent pixel refers to a pixel that is adjacent to at least one of the horizontal or vertical spans identified at step 704. At step 1004, there is a determination of whether at least a first threshold number of neighboring pixels (of the span adjacent pixel selected at step 1002) have been identified as potentially being part of a hole. Each pixel in a depth image has eight neighboring pixels. Thus, any number between zero and eight of a pixel's neighboring pixels may have been identified as potentially being part of a hole. In specific embodiments, the first threshold number is four, meaning that at step 1004 there is a determination of whether at least four neighboring pixels (of the span adjacent pixel selected at step 1002) have been identified as potentially being part of a hole. If the answer to step 1004 is yes, then flow goes to step 1006, where there is a determination of whether at least a second threshold number of the neighboring pixels (of the span adjacent pixel selected at step 1002) has been identified as a boundary of a potential hole. In specific embodiments, the second threshold number is one, meaning that at step 1006 there is a determination of whether at least one of the neighboring pixels (of the span adjacent pixel selected at step 1002) has been identified as a boundary of a potential hole. If the answer to step 1006 is no, then that span adjacent pixel is identified as potentially being part of a hole. If the answer to step 1004 is no, or the answer to step 1006 is yes, then that span adjacent pixel is not identified as potentially corresponding to a hole. As can be appreciated from steps 1010 and 1002, this process is repeated until each span adjacent pixel is analyzed. Further, it should be noted that the order steps 1004 and 1006 can be reversed. More generally, at step 706, a selective morphological dilation of spans (previously identified at step 704) is performed to identify, as potentially corresponding to a hole, further pixels or spans that were not previously identified at step 704.

Figure 11:
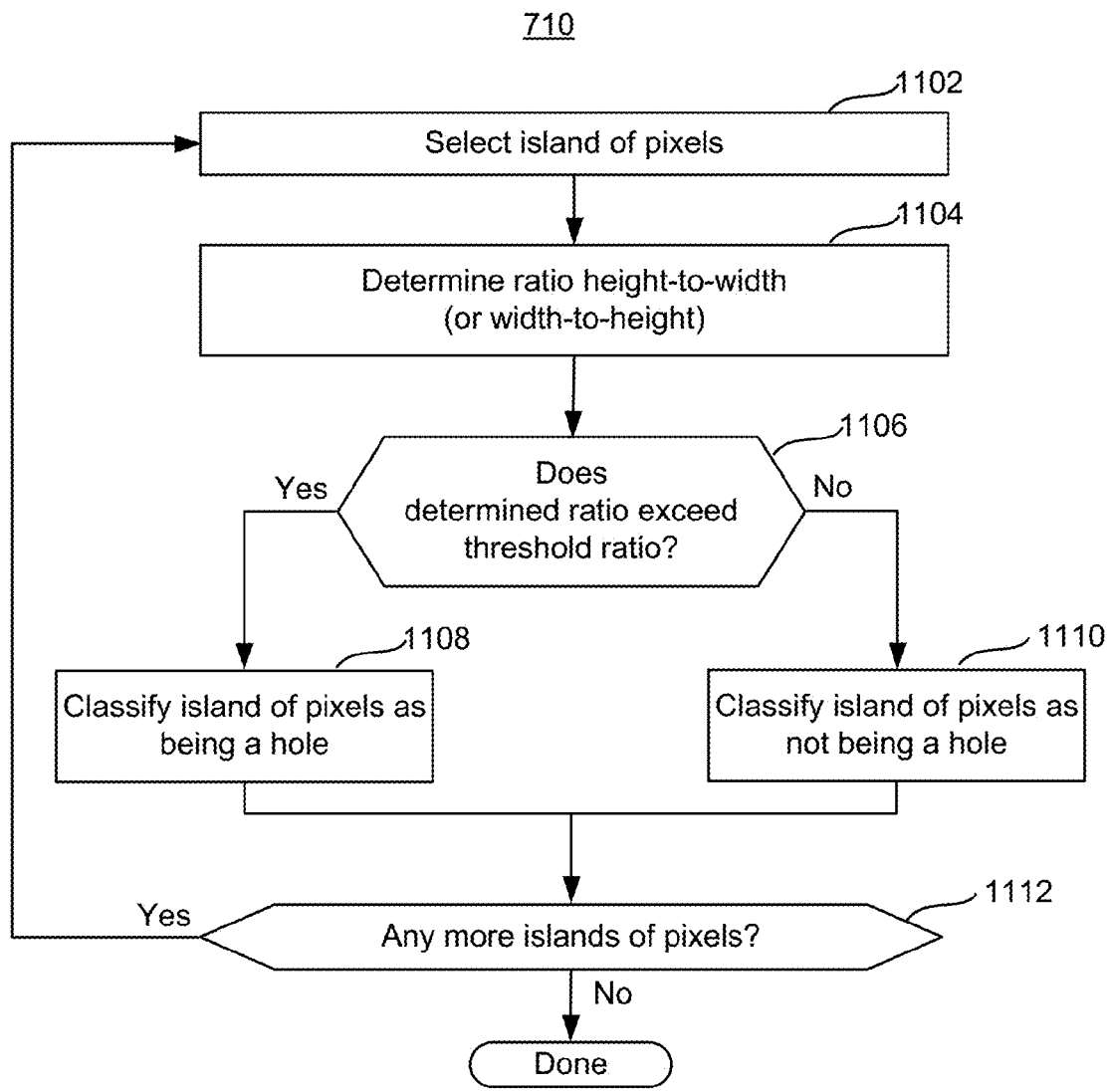
FIG. 11 illustrates a flow diagram that is used to provide additional details of step 710 in FIG. 7, according to an embodiment.

FIG. 11 will now be used to explain how, at step 710, each identified island of pixels (in the subset of pixels specified as corresponding to the user) are classified as either being a hole or not being a hole. Referring to FIG. 11, at step 1102, an island of pixels is selected for analysis. At step 1104, there is a determination of a ratio of the height-to-wide, or width-to-height of the island. Such islands of pixels typically will not resemble a square or rectangle, and thus will typically not include a uniform height or a uniform width. Accordingly, the height of an island can be considered the maximum height of the island, or the average height of the island, depending upon implementation. Similarly, depending upon implementation, the width of an island can be considered the maximum width of the island, or the average width of the island. At step 1106 there is a determination of whether the ratio determined at step 1104 exceeds a corresponding threshold ratio. If the answer to step 1106 is yes, then the island of pixels is classified as being a hole in the subset of pixels that correspond to the user. If the answer to step 1106 is no, then the island of pixels is classified as not being a hole in the subset of pixels that correspond to the user. As can be appreciated from steps 1112 and 1102, this process is repeated until each island is analyzed.

Referring back to FIG. 7, at the end of step 710, each pixel in the subset of pixels that correspond to the user, will either be classified as being part of a hole, or not being part of a hole. Further, at the end of step 710, holes that need filling will have been identified, and the boundaries of such holes will have been identified. Thereafter, as was described above with reference to FIG. 7, hole filling is performed at step 712, information indicative of results of the hold filling is stored at step 714 and is available for use when displaying an image that includes a representation of the user at step 716.

Figure 12A:
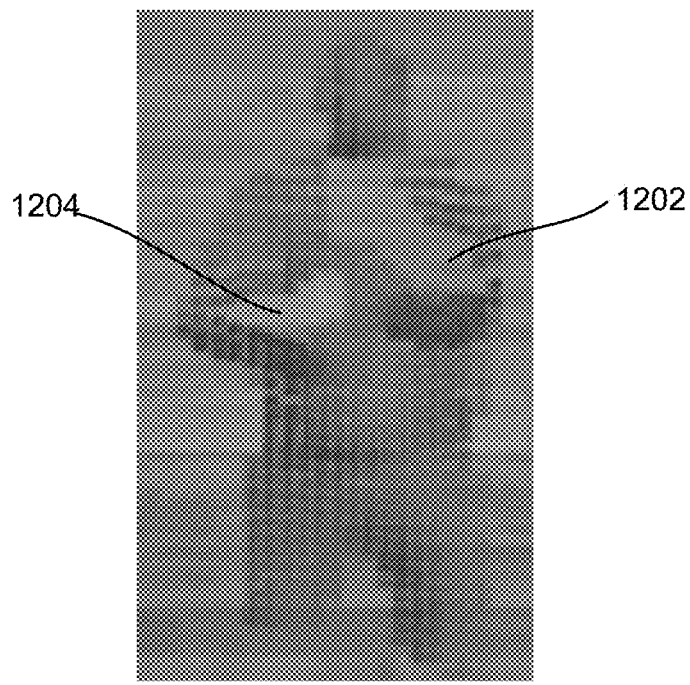
FIG. 12A is used to illustrate two exemplary islands of pixels that were classified holes using embodiments described herein.
Figure 12B:
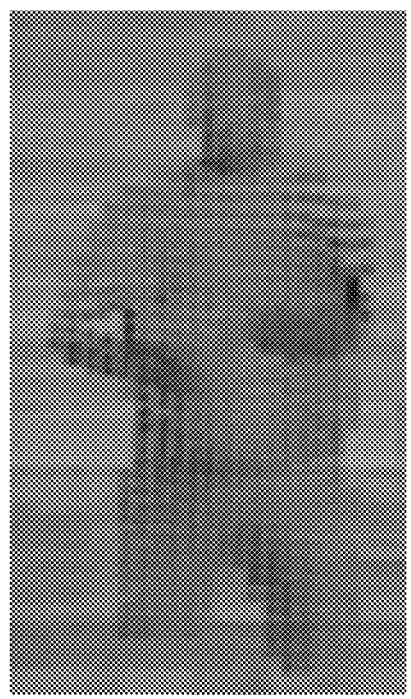
FIG. 12B illustrates results of hole filling the islands of pixels classified as holes that were illustrated in FIG. 12A.

FIG. 12A illustrates two exemplary islands of pixels 1202 and 1204 that were classified as holes using embodiments described above with reference to FIGS. 7 and 9-11. FIG. 12B illustrates results of the hole filling performed at step 712.

As explained above, a segmentation process (e.g., performed by the depth image segmentation module 252) can be used to specify which subset of pixels correspond to a user. However, it is sometimes the case that pixels corresponding to a portion of a floor, supporting the user, will mistakenly also be specified as corresponding to the user. This can cause problems when attempting to detect user motion or other user behaviors based on depth images, or when attempting to display images including a representation of the user. To avoid or reduce such problems, the floor removal method described with reference to FIG. 13 can be used. Such a floor removal method can be used with the methods described above with reference to FIGS. 7-11, or completely independently. When used with the methods described with reference to FIGS. 7-11, the floor removal method can be performed prior to step 702, as part of step 702, between steps 702 and 704, or between steps 714 and 716, but is not limited thereto. Such a floor removal method involves identifying one or more pixels, of the subset of pixels specified as corresponding to the user, that likely correspond to a floor that is supporting the user. This enables the removal of the pixels, identified as likely corresponding to the floor, from the subset of pixels specified as corresponding to the user.

Figure 13:
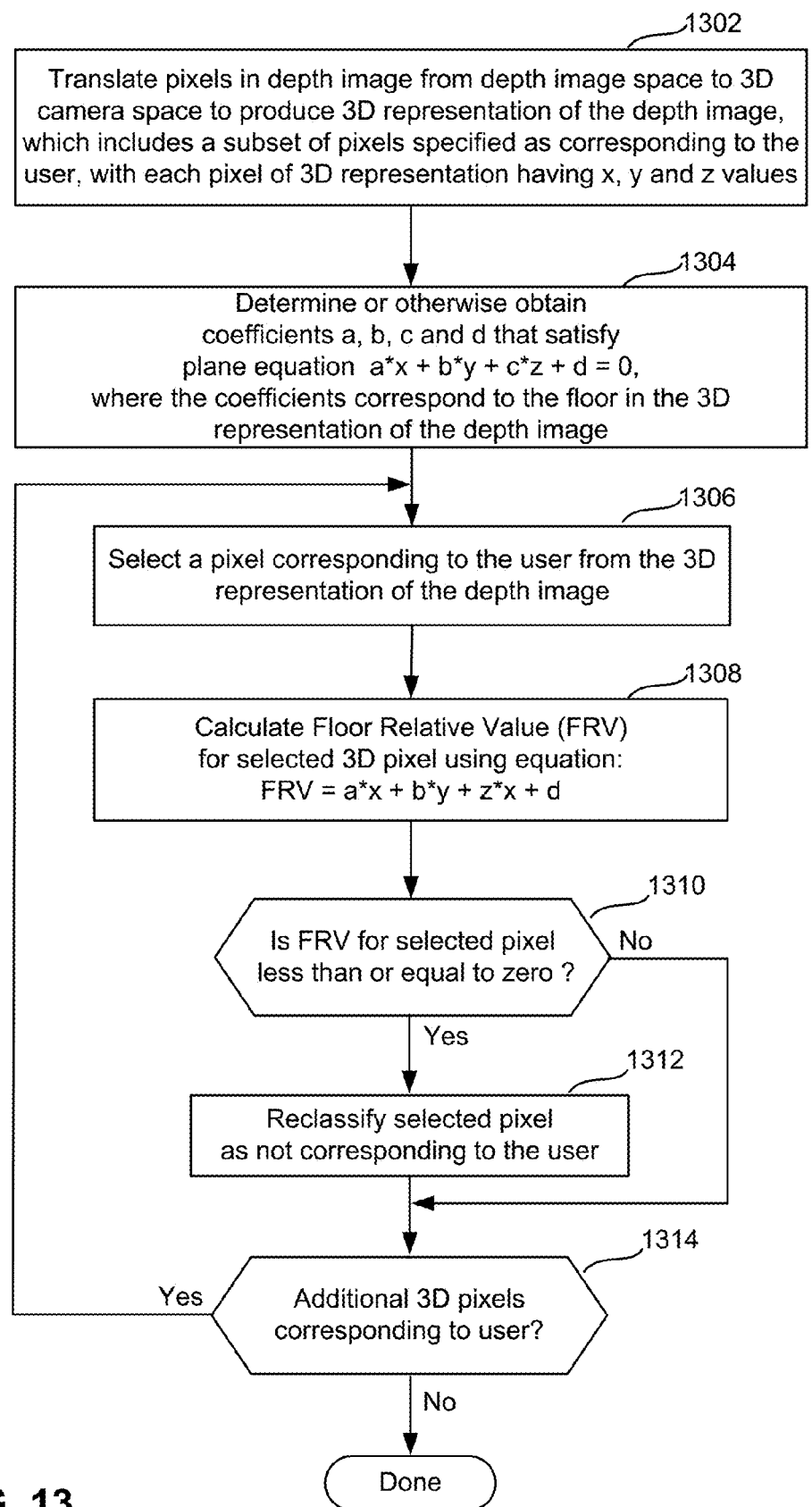
FIG. 13 is a high level flow diagram that is used to summarize a floor removal method, according to an embodiment.

In order to perform the floor removal method, pixels of a depth image are transformed from depth image space to three-dimensional (3D) camera space, to produce a 3D representation of the depth image, as indicated at step 1302 in FIG. 13. Additionally, as indicated at step 1304, coefficients a, b, c and d that satisfy the plane $a*x+b*y+c*z+d=0$ are determined or otherwise obtained, where such coefficients correspond to the floor in the 3D representation of the depth image. Thereafter, there is a determination of whether pixels specified as corresponding to the user are either above the floor plane or below the floor plane. Pixels below the floor plane are more likely to correspond to the floor than to correspond to the user, and thus, such pixels are reclassified as to not corresponding to the user. Such a process can be accomplished using steps 1306-1314 described below.

Still referring to FIG. 13, at step 1306, a pixel specified as corresponding to the user is selected from the 3D representation of the depth image. At step 1308, a floor relative value (FRV) is calculated for the selected pixel using the equation $FRV=a*x+b*y+c*z+d$, where the a, b, c and d coefficients corresponding to the floor are used, and the z, y and z values of the selected pixel are used. At step 1310 there is a determination of whether the calculated FRV value is less than or equal to zero, or alternatively, whether the calculated FRV is less than zero. If the answer to step 1310 is yes, then that pixel is considered to be more likely part of the floor, and thus, is no longer specified as corresponding to the user, as indicated at step 1312. As can be appreciated from steps 1314 and 1306, this process is repeated until each pixel specified as corresponding to the user is analyzed. Alternatively, only those pixels that are considered to be in close proximity to the floor might be analyzed. In other words, pixels selected at step 1306 might only be pixels within a specified distance of the floor.

A capture device (e.g., 120) that is used to obtain depth images may be tilted relative to the floor upon which a user is standing or otherwise supporting themselves. Thus, depth images obtained using such a capture device may vary in dependence on the tilt of the capture device. However, it is desirable that detecting of user behaviors and displaying images including representations of a user based on depth images are not dependent on the tilt of the capture device. Accordingly, it would be useful to account for the capture device's tilt. This can be accomplished by transforming pixels of a depth image from depth image space to three-dimensional (3D) camera space, to produce a 3D representation of the depth image which includes a subset of pixels specified as corresponding to the user. Additionally, an up vector can be obtained from a sensor (e.g., an accelerometer) or in some other manner and used to generate a new projection direction. Each pixel can then be reprojected to another plane that is at a fixed attitude to the ground. The pixels can then be transformed from 3D camera space back to depth image space, with the resulting depth image having less sensitivity to camera tilt.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A method for use with depth images, comprising:
    obtaining a depth image and information that specifies that a subset of pixels within the depth image correspond to a user;
    transforming pixels in the depth image from depth image space to three-dimensional (3D) camera space to produce a 3D representation of the depth image in the 3D camera space which includes a subset of pixels in the 3D camera space specified as corresponding to the user;
    after the transforming, identifying one or more pixels in the 3D camera space, of the subset of pixels in the 3D camera space specified as corresponding to the user, that likely correspond to a floor that is supporting the user;
    removing, from the subset of pixels in the 3D camera space specified as corresponding to the user, the one or more pixels in the 3D camera space identified as likely corresponding to the floor that is supporting the user; and
    after the removing, transforming the 3D representation of the depth image from the 3D camera space back to the depth image space.

2. The method of claim 1, wherein the identifying and removing comprise:
    obtaining coefficients corresponding to the floor that satisfy a specified plane equation; and
    for at least some pixels of the subset of pixels in the 3D camera space specified as corresponding to the user in the 3D representation of the depth image
    calculating a floor relative value (FRV);
    comparing the FRV to a specified value;
    determining, based on results of the comparing, whether or not to remove the pixel from the subset of pixels in the 3D camera space specified as corresponding to the user; and
    removing the pixel, from the subset of pixels in the 3D camera space specified as corresponding to the user, if it is determined that the pixel is to be removed.

3. The method of claim 2, wherein the specified plane equation is $a*x + b*y + c*z + d = 0$, and wherein the obtaining coefficients corresponding to the floor that satisfy the specified plane equation comprises determining values for coefficients a, b, c and d in the specified plane equation.

4. The method of claim 3, wherein the calculating the FRV, which is calculated for the at least some of the pixels of the subset of pixels in the 3D camera space specified as corresponding to the user in the 3D representation of the depth image, comprises:
    selecting a pixel in the 3D camera space specified as corresponding to the user from the 3D representation of the depth image; and
    calculating the FRV for the selected pixel using the equation $FRV = a*x + b*y + c*z + d$, where the a, b, c and d coefficients corresponding to the floor are used, and the x, y and z values of the selected pixel are used.

5. The method of claim 4, further comprising repeating the selecting a pixel and the calculating the FRV for the selected pixel, for each of the at least some of the pixels of the subset of pixels in the 3D camera space specified as corresponding to the user in the 3D representation of the depth image.

6. The method of claim 2, wherein the at least some pixels, of the subset of pixels in the 3D camera space specified as corresponding to the user in the 3D representation of the depth image, comprises all pixels of the subset.

7. The method of claim 2, wherein the at least some pixels, of the subset of pixels in the 3D camera space specified as corresponding to the user in the 3D representation of the depth image, comprises only pixels of the subset that are within a specified distance of the floor.

8. The method of claim 2, wherein:
    the specified value is zero;
    the comparing the FRV to the specified value comprises comparing the FRV to zero to determine whether the FRV is less than or equal to zero; and
    the determining, based on results of the comparing, whether or not to remove the pixel from the subset of pixels in the 3D camera space specified as corresponding to the user, comprises determining that the pixel is to be removed from the subset of pixels in the 3D camera space specified as corresponding to the user if the FRV for the pixel is determined to be less than or equal to zero.

9. The method of claim 2, wherein:
    the specified value is zero;
    the comparing the FRV to the specified value comprises comparing the FRV to zero to determine whether the FRV is less than zero; and
    the determining, based on results of the comparing, whether or not to remove the pixel from the subset of pixels in the 3D camera space specified as corresponding to the user, comprises determining that the pixel is to be removed from the subset of pixels in the 3D camera space specified as corresponding to the user if the FRV for the pixel is determined to be less than zero.

10. The method of claim 1, further comprises:
    adjusting the depth image to reduce a sensitivity of the depth image to tilt of a capture device used to obtain the depth image.

11. The method of claim 10, wherein the adjusting the depth image to reduce the sensitivity of the depth image to tilt of the capture device comprises:
    obtaining an up-vector associated with the capture device used to obtain the depth image;
    transforming pixels in the depth image from depth image space to three-dimensional (3D) camera space to produce a 3D representation of the depth image which includes a subset of pixels in the 3D camera space specified as corresponding to the user;

using the up-vector to transform the subset of pixels in the 3D camera space specified as corresponding to the user to a plane having a specified attitude; and transforming the 3D representation of the depth image from the 3D camera space back to the depth image space.

12. The method of claim 1, further comprising:

after the removing, and after the transforming the 3D representation of the depth image from the 3D camera space back to the depth image space, using remaining pixels in the subset of pixels specified as corresponding to the user, when displaying an image corresponding to the user.

13. A system, comprising:

a capture device that obtains depth images;

a communication interface that receives depth images from the capture device; and one or more storage devices that store depth images;

one or more processors in communication with the one or more storage devices, wherein the one or more processors are configured to obtain a depth image and information that specifies that a subset of pixels within the depth image correspond to a user;

transform pixels in the depth image from depth image space to three-dimensional (3D) camera space to produce a 3D representation of the depth image in the 3D camera space which includes a subset of pixels in the 3D camera space specified as corresponding to the user;

identify one or more pixels in the 3D camera space, of the subset of pixels in the 3D camera space specified as corresponding to the user, that likely correspond to a floor that is supporting the user; and remove, from the subset of pixels in the 3D camera space specified as corresponding to the user, the one or more pixels in the 3D camera space identified as likely corresponding to the floor that is supporting the user.

14. The system of claim 13, wherein the one or more processors, in order to identify and remove the one or more pixels in the 3D camera space that likely correspond to a floor that is supporting the user, from the subset of pixels in the 3D camera space specified as corresponding to the user, are configured to:

obtain coefficients corresponding to the floor that satisfy a specified plane equation; and for at least some pixels of the subset of pixels in the 3D camera space specified as corresponding to the user in the 3D representation of the depth image calculate a floor relative value (FRV);

compare the FRV to a specified value;

determine, based on results of the comparing, whether or not to remove the pixel from the subset of pixels in the 3D camera space specified as corresponding to the user; and remove the pixel, from the subset of pixels in the 3D camera space specified as corresponding to the user, if it is determined that the pixel is to be removed.

15. The system of claim 14, wherein the one or more processors are configured to transform the 3D representation of the depth image from the 3D camera space back to the depth image space, after the pixels to be removed have been removed from the subset of pixels specified as corresponding to the user.

16. The system of claim 13, wherein the one or more processors are also configured to adjust the depth image to reduce a sensitivity of the depth image to tilt of the capture device.

17. The system of claim 16, wherein in order to adjust the depth image to reduce the sensitivity of the depth image to tilt of the capture device, the one or more processors are configured to:

obtain an up-vector associated with the capture device used to obtain the depth image; and use the up-vector to transform the subset of pixels in the 3D camera space specified as corresponding to the user to a plane having a specified attitude.

18. One or more processor readable storage devices having instructions encoded thereon which when executed cause one or more processors to perform a method, the method comprising:

obtaining a depth image and information that specifies that a subset of pixels within the depth image correspond to a user;

transforming pixels in the depth image from depth image space to three-dimensional (3D) camera space to produce a 3D representation of the depth image in the 3D camera space which includes a subset of pixels in the 3D camera space specified as corresponding to the user;

after the transforming, identifying one or more pixels in the 3D camera space, of the subset of pixels in the 3D camera space specified as corresponding to the user, that likely correspond to a floor that is supporting the user;

removing, from the subset of pixels in the 3D camera space specified as corresponding to the user, the one or more pixels in the 3D camera space identified as likely corresponding to the floor that is supporting the user; and after the removing, transforming the 3D representation of the depth image from the 3D camera space back to the depth image space.

19. The one or more processor readable storage devices of claim 18, wherein the identifying and removing comprise:

obtaining coefficients corresponding to the floor that satisfy a specified plane equation; and for at least some pixels of the subset of pixels in the 3D camera space specified as corresponding to the user in the 3D representation of the depth image calculating a floor relative value (FRV);

comparing the FRV to a specified value;

determining, based on results of the comparing, whether or not to remove the pixel from the subset of pixels in the 3D camera space specified as corresponding to the user; and removing the pixel, from the subset of pixels in the 3D camera space specified as corresponding to the user, if it is determined that the pixel is to be removed.

20. The one or more processor readable storage devices of claim 18, wherein the method further comprises adjusting the depth image to reduce a sensitivity of the depth image to tilt of a capture device used to obtain the depth image, wherein the adjusting the depth image includes:

obtaining an up-vector associated with the capture device used to obtain the depth image; and using the up-vector to transform the subset of pixels in the 3D camera space specified as corresponding to the user to a plane having a specified attitude.

\* \* \* \* \*